US008805730B2

(12) United States Patent
Yeri et al.

(10) Patent No.: US 8,805,730 B2
(45) Date of Patent: Aug. 12, 2014

(54) TRIGGER DATA QUALITY MONITOR

(75) Inventors: Naveen G. Yeri, Charlotte, NC (US); Bibhudatta Jena, Hyderabad (IN); Arya Kumar Vedabrata, Hyderabad (IN); Chandrashekar Katuri, Hyderabad (IN); Timothy J. Bendel, Charlotte, NC (US); David Joa, San Bruno, CA (US); Vikas Mishra, Pune (IN); Thayer S. Allison, Jr., Charlotte, NC (US); Deepak Verma, Middletown, DE (US); Yanghong Shao, Charlotte, NC (US); Parul Bajaj, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/486,593

(22) Filed: Jun. 1, 2012

(65) Prior Publication Data

US 2013/0325674 A1 Dec. 5, 2013

(51) Int. Cl.
*G07F 19/00* (2006.01)
(52) U.S. Cl.
USPC .................................. 705/30; 705/35; 705/41
(58) Field of Classification Search
USPC .................................. 705/35, 38, 39, 40, 30
See application file for complete search history.

(56) References Cited

U.S. PATENT DOCUMENTS

| | | | |
|---|---|---|---|
| 5,864,483 A * | 1/1999 | Brichta ........................ 700/109 |
| RE38,801 E | 9/2005 | Rogers | |
| 7,792,727 B2 | 9/2010 | Ghosh et a. | |
| 8,078,529 B1 | 12/2011 | Carrier et al. | |
| 2004/0024617 A1 | 2/2004 | Fralic | |
| 2004/0039686 A1 | 2/2004 | Klebanoff | |
| 2004/0088243 A1 | 5/2004 | McCoy et al. | |
| 2005/0086166 A1 * | 4/2005 | Monk et al. ..................... 705/41 |
| 2006/0129896 A1 | 6/2006 | Rohn | |
| 2006/0271997 A1 | 11/2006 | Jacoby et al. | |
| 2006/0276180 A1 | 12/2006 | Henry, Jr. | |
| 2007/0021991 A1 | 1/2007 | Etzioni et al. | |
| 2007/0078719 A1 | 4/2007 | Schmitt et al. | |
| 2007/0078869 A1 | 4/2007 | Carr et al. | |
| 2007/0106558 A1 | 5/2007 | Mitchell et al. | |
| 2008/0177650 A1 | 7/2008 | Jung et al. | |
| 2008/0177726 A1 | 7/2008 | Forbes et al. | |
| 2009/0024496 A1 | 1/2009 | Balachandran et al. | |
| 2009/0164351 A1 | 6/2009 | Sorbe et al. | |

(Continued)

OTHER PUBLICATIONS

Pending U.S. Appl. No. 13/486,605.

(Continued)

*Primary Examiner* — Ojo Oyebisi
(74) *Attorney, Agent, or Firm* — Michael A. Springs; Moore & Van Allen PLLC

(57) ABSTRACT

Systems and methods for monitoring trigger data quality are provided herein. The systems and methods detect and report whether the current trigger counts are normal or flawed in real time. The systems and methods monitor the triggers to determine the accuracy, completeness, domain of values, and format of the trigger data. In the system and methods, account data associated with the one or more accounts is received and stored in a storage device; the account data is segregated into one or more periods of time; triggers associated with the one or more periods of time are identified based on transactions that occur during the one or more periods of time; a total transaction count for each of the triggers is calculated; and control limits are determined based on the transaction count for each of the triggers.

18 Claims, 22 Drawing Sheets

(56) References Cited

U.S. PATENT DOCUMENTS

| | | |
|---|---|---|
| 2009/0222325 A1 | 9/2009 | Anderson et al. |
| 2009/0271287 A1 | 10/2009 | Halpern |
| 2009/0287536 A1 | 11/2009 | Sheng |
| 2009/0292632 A1 | 11/2009 | Dheer et al. |
| 2009/0327308 A1 | 12/2009 | Carter et al. |
| 2010/0145857 A1 | 6/2010 | Davila et al. |
| 2010/0223264 A1 | 9/2010 | Bruckner et al. |
| 2010/0280927 A1 | 11/2010 | Faith et al. |
| 2011/0125565 A1 | 5/2011 | Macilwaine et al. |
| 2011/0125643 A1 | 5/2011 | Cameo et al. |
| 2011/0166994 A1 | 7/2011 | Ross et al. |
| 2011/0231305 A1 | 9/2011 | Winters |
| 2011/0238550 A1 | 9/2011 | Reich et al. |
| 2011/0246278 A1 | 10/2011 | Kubo |
| 2011/0251917 A1 | 10/2011 | Etzioni et al. |
| 2011/0302079 A1 | 12/2011 | Neuhaus |
| 2013/0090998 A1 | 4/2013 | Shimogori |

OTHER PUBLICATIONS

Pending U.S. Appl. No. 13/486,612.
Pending U.S. Appl. No. 13/486,191.
Pending U.S. Appl. No. 13/486,631.
Pending U.S. Appl. No. 13/486,198.
Pending U.S. Appl. No. 13/486,617.
Pending U.S. Appl. No. 13/486,580.
Pending U.S. Appl. No. 13/486,816.
Pending U.S. Appl. No. 13/486,781.
Pending U.S. Appl. No. 13/486,585.
Pending U.S. Appl. No. 13/486,739.
Pending U.S. Appl. No. 13/486,680.
Ferris, Tom, "Banks warned in wake of Huton mess." American Banker, SourceMedia Inc. 1985. HighBeam Research. Apr. 14, 2013 http://www.highbeam.com/.

* cited by examiner

ISSUE TRACKING TABLE

| Date | Week Day | Trigger | Frequency | LCL | Count | UCL | Alert Type | Action |
|---|---|---|---|---|---|---|---|---|
| 1-Dec | Thurs | Trigger-1 | Daily | 45831 | 104860 | 87014 | Outlier | Supress |
| 1-Dec | Thurs | Trigger-2 | Daily | 76 | 77 | 172 | Normal | |
| 2-Dec | Fri | Trigger-1 | Daily | 87759 | 81205 | 159389 | Outlier | Supress |
| 2-Dec | Fri | Trigger-2 | Daily | 1259 | 1269 | 1658 | Normal | |
| 3-Dec | Sat | Trigger-1 | Daily | 0 | 0 | 0 | | |
| 3-Dec | Sat | Trigger-2 | Daily | 0 | 0 | 0 | | |
| 4-Dec | Sun | Trigger-1 | Daily | 0 | 0 | 0 | | |
| 4-Dec | Sun | Trigger-2 | Daily | 0 | 0 | 0 | | |
| 5-Dec | Mon | Trigger-1 | Daily | 86843 | 107066 | 157455 | Normal | |
| 5-Dec | Mon | Trigger-2 | Daily | 44 | 104 | 113 | Normal | |
| 6-Dec | Tues | Trigger-1 | Daily | 53464 | 60214 | 111612 | Normal | |
| 6-Dec | Tues | Trigger-2 | Daily | 56 | 248 | 100 | Outlier | Supress |
| 7-Dec | Wed | Trigger-1 | Daily | 47692 | 53416 | 77858 | Normal | |
| 7-Dec | Wed | Trigger-3 | Daily | 23267 | 31138 | 44186 | Normal | |
| 7-Dec | Wed | Trigger-2 | Daily | 44 | 30 | 84 | Outlier | Supress |
| 8-Dec | Thurs | Trigger-1 | Daily | 47874 | 56286 | 81416 | Normal | |
| 8-Dec | Thurs | Trigger-3 | Daily | 23267 | 28823 | 44186 | Normal | |
| 8-Dec | Thurs | Trigger-2 | Daily | 76 | 112 | 172 | Normal | |
| 9-Dec | Fri | Trigger-1 | Daily | 84956 | 89824 | 156820 | Normal | |
| 9-Dec | Fri | Trigger-3 | Daily | 23267 | 30382 | 44186 | Normal | |
| 9-Dec | Fri | Trigger-2 | Daily | 1259 | 1646 | 1658 | Normal | |
| 10-Dec | Sat | Trigger-1 | Daily | 0 | 0 | 0 | | |

*FIG. 13B*

| TRIGGER TABLE 1 | | |
|---|---|---|
| Trigger | Objective | Description |
| Deposit Reduction 1 (DR1) | User Retention | Decrease in monthly deposits in the last 3 months. Identifies patterns for the beginning of the current month and end of the previous month incoming deposits. Runs on 8$^{th}$ calendar day of every month. |
| Deposit Reduction 2 (DR2) | User Retention | Decrease in monthly deposits in the last 3 months. Identifies end of the current month incoming deposits. Runs on 22$^{nd}$ calendar day of every month |
| Deposit reduction for all users (DRA) | User Retention | Decrease in monthly deposits in the last 3 months |
| Deposit reduction for credit card users only (DRT) | User Retention | Decrease in monthly deposits in the last 3 months |
| Monthly maintenance cost (MTH) | User Retention | Monthly maintenance costs incurred on checking and savings accounts |
| First time monthly maintenance cost-daily (FMD) | User Retention | First time monthly maintenance cost in last six months through MTH category for outbound cost transactions. Refreshed daily to provide a more timely indicator that the event has occurred when compared to FMT |
| First time monthly maintenance cost- weekly (FMT) | User Retention | First time monthly maintenance cost in last six months through MTH category for outbound cost transactions. |
| Outgoing ACH drop (OAD) | User Retention | Current month count (#) </= 50% of avg. # of transactions in the previous 3 months (stability period), where a month is defined as a 4 week rolling period; Avg. # of transactions in the stability period >/= 3. OA1/((OA2+OA3+OA4)/3) is between 0 and 0.5 |
| Outgoing ACH stop (OAS) | User Retention | Current month outgoing ACH transaction count = 0. Avg. # of outgoing ACH transactions in the previous 3 months (stability period) >/= 3, where month is defined as a 4 week rolling period. OA1/((OA2+OA3+OA4)/3)= 0 |
| Outgoing ACH transaction counts for current month (monitoring period) (OA1) | User Retention | Provides outgoing ACH transaction counts for the current month (Monitoring Period). |

FIG. 14A

| TRIGGER TABLE 1-CONTINUED | | |
|---|---|---|
| Trigger | Objective | Description |
| Outgoing ACH transaction counts for month 1 of the 3 month stability period (OA2) | User Retention | Provides outgoing ACH transaction counts for the first month of the 3 month Stability Period. |
| Outgoing ACH transaction counts for month 2 of the 3 month stability period (OA3) | User Retention | Provides outgoing ACH transaction counts for the second month of the 3 month Stability Period. |
| Outgoing ACH transaction counts for month 3 of the 3 month stability period (OA4) | User Retention | Provides outgoing ACH transaction counts for the third month of the 3 month Stability Period. |
| Payment and purchase reduction (PPR) | User Retention | Outgoing payment transactions from financial institution's checking, saving, and credit card accounts that meet the following criteria:<br>1) Current month # of payments minus prior 3 month avg. # of payments >/= 10<br>2) Current month total payment amount minus prior 3 month avg. total payment amount >/= $1,500<br>3) Current month total payment amount divided by the prior 3 month avg. total payment amounts </= 50% |
| Current month payment/ purchase (PP1) | User Retention | Current month transaction amount and transaction count for payments |
| Previous 3 month avg. payment/purchase (PP3) | User Retention | Previous 3 month average transaction amount and average transaction count for payments |
| Payment reduction trigger (PRT) | User Retention | Decrease in payments in last 2 months in key necessity categories (e.g., auto loans, mortgage, utilities) |

FIG. *14B*

| TRIGGER TABLE 2 | | |
|---|---|---|
| Trigger | Objective | Description |
| No ACH deposit but either ATM or Teller deposits (ATT) | User Deepening | No ACH deposit, but ATM or teller deposits in the last two months |
| Monthly deposit increase for engaged users (IGT) | User Deepening | Incoming amount greater than $50 with increase in pattern/behavior of 20% or greater in the current month versus previous month |

FIG. *14C*

| TRIGGER TABLE 2-CONTINUED | | |
|---|---|---|
| Trigger | Objective | Description |
| No ATM withdrawals in the second last month but ATM withdrawals in the last month (AWL) | User Deepening | No ATM withdrawals in the second last month but had ATM withdrawals in the last month |
| Inbound internal transfer in the last month (IXF) | User Deepening | No inbound internal transfer in the third previous and second previous month, but had inbound internal transfer in the last month |
| ATM deposits (NAD) | User Deepening | No ATM deposits in the second last month but had ATM deposits in the last month |
| Outbound internal transfer in the last month (OXF) | User Deepening | No outbound internal transfer in the third previous and second previous month, but had outbound internal transfer in the last month |
| Direct deposit pay (DDP) | User Deepening | Direct deposit inbound transactions during a time period |

FIG. 14D

| TRIGGER TABLE 3 | | |
|---|---|---|
| Trigger | Objective | Description |
| Merchant purchases (AIU) | Account review | Purchases made from specific merchants in a time period |
| First time competitor credit card payment (FOC) | Account review | First competitor credit card payment in the last six months |
| Large withdrawal (LWD) | Account review | Large transaction deposits for which, the transaction amount > $2,500; transaction amount > 2.5 * Average of previous six months; account tenure > 90 days |
| Large withdrawal avg. (LWA) | Account review | Average withdrawal amount for the rolling six month period that is leveraged in the LWD trigger |
| New payment trigger (NPT) | Account review | No inbound payroll transactions for two months in a row, received pay during current and previous month |
| Student loan (STL) | Account review | Payments on a student loan |

FIG. 14E

| TRIGGER TABLE 3-Continued | | |
|---|---|---|
| Trigger | Objective | Description |
| Micro ACH transfer (VFY) | Account review | Identifies users who have opened new online savings accounts with third parties by detecting off-us relationships as early as possible. This leverages the signals presented through micro transfers (i.e., < $1) that are often credited to checking or savings accounts before substantial amounts are transferred to the off-us accounts |
| Job change (JCL) | Account review | Transactions that include at least 3 ACH direct deposits from the same employer during a 4 month period (stability period). JCL triggered if pay frequency, i.e., maximum number of days between the 3 most recent ACH deposits + "pad," passes without another ACH direct deposit by a particular employer. Pad is defined as:<br>If max # of days </= 7, then +2 days "pad"<br>if max # of days is 8-18, then +3 days "pad"<br>if max # of days is 16-32, then +5 days "pad" |

FIG. 14F

| TRIGGER TABLE 4 | | |
|---|---|---|
| Trigger | Objective | Description |
| Competitor Brokerage Outflow (CBO) | Product Sales | Third party competitor brokerage payments of at least $1,000 for a single month (30 day rolling) OR at least $500 per month over a three month period. |
| Competitor Brokerage Outflow total for the first of the three month rolling period (CB1) | Product Sales | Provides the cumulative total for the first month (1-30 days) of the the three month period. |
| Competitor Brokerage Outflow total for the second of the three month rolling period (CB2) | Product Sales | Provides the cumulative total for the second month (31-60 days) of the the three month period. |

FIG. 14G

| TRIGGER TABLE 4-Continued | | |
|---|---|---|
| Trigger | Objective | Description |
| Competitor Brokerage Outflow total for the third of the three month rolling period (CB3) | Product Sales | Provides the cumulative total for the third month (61-90 days) of the the three month period. |
| College preparation (SAT) | Product Sales | Payments for college preparation or courses or tutoring for such preparation |
| Other education (EDU) | Product Sales | Payments to an education entity and not a student loan and not a college preparation payment |
| Online shopper (OLS) | Product Sales | Online payments during a time period |
| Off us credit card (OUC) | Product Sales | Payments toward a credit card debt, the credit card being associated with a third party institution |
| Telecom payment (TEL) | Product Sales | Payments to a telecom company |
| Wireless service (WIR) | Product Sales | Payments to a wireless company |
| Large deposits (LDS) | Product Sales | Large transaction deposits for which, the transaction amount > $2,500; transaction amount > 2.5 * Average of previous six months; account tenure > 90 days |
| Payment Increase (PIT) | Product Sales | Increase in pay by 10% or more during current and previous month, compared over 2 month period |
| Bonus Recurrence | Product Sales | Identifies sub-set of large deposits as bonuses well before the event actually happens. This trigger is refreshed on a yearly basis. Trigger is based on: 1) Stability: direct paycheck deposits received at least 10 months in a year; 2) identify a single paycheck with an amount at least twice as much as the median value of all paychecks in a year and that amount is at least $2,500 (this is identified as bonus); 3) focus is on "bonus season," i.e., December, January, February, and March; and 4) In recent two years the "bonus" paycheck is received around the same time each year |

FIG. 14H

| TRIGGER TABLE 4-CONTINUED | | |
|---|---|---|
| Trigger | Objective | Description |
| Tax recurrence | Product Sales | Tax refunds of at least $10,000 in the past two years, trigger is refreshed on a yearly basis |
| Tax rebate/refund (TAX) | Product Sales | Tax rebates (federal and state) |
| Tax refund having total transaction amount >/= $1,000 (T11) | Product Sales | Tax refunds with total transaction amount greater than or equal to $1,000 |
| Insurance (INS) | Product Sales | Payments to an insurance company |

FIG. 14I

| TRIGGER TABLE 5 | | |
|---|---|---|
| Trigger | Objective | Description |
| First time unavailable funds | Policy Education | Account costs for unavailable funds incurred for the first time in the last six months |
| First time account gone to loss | Policy Education | Account costs for account gone to loss incurred for the first time in the last six months |
| Unavailable funds | Policy Education | Account costs for unavailable funds incurred |
| Account gone to loss | Policy Education | Account costs for account gone to loss incurred |

FIG. 14J

TRIGGER DATA QUALITY MONITOR

BACKGROUND

Customers of financial institutions often find it difficult to keep track of their account activities. These customers may be unaware of the details of their transactions, account balances, and account policies and may miss potential opportunities and susceptibilities associated with their accounts. For example, a customer may not realize that they are eligible for an upgraded service because they are unfamiliar with their bank's policies and products. Moreover, financial institutions usually have large volumes of data to organize and maintain, and may not have the resources to easily analyze the data and keep customers informed. Such financial institutions may miss opportunities for growth by failing to inform their customers of possible issues, offers, and product updates at the most opportune times. For example, a financial institution may fail to timely notify a customer of an investment offer and may miss an opportunity to strengthen their relationship with the customer as a consequence.

BRIEF SUMMARY

The embodiments provided herein are directed to a system for monitoring trigger data quality associated with one or more accounts of a financial institution. The system includes: a computer apparatus including a processor and a memory; and a trigger software module stored in the memory, comprising executable instructions that when executed by the processor cause the processor to: receive account data associated with the one or more accounts; store the account data in a storage device; segregate the account data into one or more periods of time; identify triggers associated with the one or more periods of time based on transactions that occur during the one or more periods of time; calculate a total transaction count for each of the triggers; and determine control limits based on the transaction count for each of the triggers.

In some embodiments of the system, the module is further configured to: calculate a lower control limit as the difference of the trimmed mean of the transaction count and the standard deviation of the transaction count; calculate an upper control limit as the sum of the trimmed mean of the transaction count and the standard deviation of the transaction count; and detect outliers based on the lower control limit and the upper control limit. The module is further configured to: delete the outliers from the trigger data. The module is configured to: calculate a first transaction count for a first trigger associated with a first period of time determine that the first transaction count for the first trigger is within an acceptable range of values; calculate a second transaction count for a second trigger associated with a second period of time; and determine that the second transaction count for the second trigger is outside of the acceptable range of values. The module is configured to: tag the second trigger as an outlier trigger and/or tag the first trigger as a normal trigger.

In other embodiments of the system, the module is configured to: calculate a first lower control limit for transactions that occur during a first period of time and a second lower control limit for transactions that occur during a second period of time; compare the first lower control limit and the second lower control limit; determine the first lower control limit is higher or lower than the second lower control limit; calculate a first upper control limit for transactions that occur during the first period of time and a second upper control limit for transaction that occur during the second period of time; compare the first upper control limit and the second upper control limit; determine that the first upper control limit is higher or lower than the second upper control limit; and detect outliers based on the comparison of the first lower control limit and the second lower control limit and the comparison of the first upper control limit and the second upper control limit.

In further embodiments of the system, the module is further configured to: determine the cause of the outliers, determine that the outliers comprise the transactions that occur during the first period of time, and/or delete the transactions that occur during the first period of time from the trigger data. The module is further configured to delete at least one of the transactions that occur during the first period of time from the trigger data; and recalculate the transaction count for a trigger associated with the first period of time. The module is further configured to determine that the transactions that occur during the second period of time comprise first parameters; compare the transactions that occur during the first period of time with the transactions that occur during the second period of time; determine that at least one of the transactions that occur during the first period of time comprises second parameters that fall outside of the range of the first parameters; and modify the first parameters. The module is configured to: tag the outliers; and report the tagged outliers to an analyst.

In some embodiments, a method for monitoring trigger data quality associated with one or more accounts of a financial institution is provided. The method including: receiving account data associated with the one or more accounts; storing the account data in a storage device; segregating the account data into one or more periods of time; identifying triggers associated with the one or more period of time based on transactions that occur during the one or more periods of time; calculating a total transaction count for each of the triggers; and determining control limits based on the transaction count for each of the triggers.

In some embodiments of the method, the method further includes calculating a lower control limit as the difference of the trimmed mean of the transaction count and the standard deviation of the transaction count; calculating an upper control limit as the sum of the trimmed mean of the transaction count and the standard deviation of the transaction count; and detecting outliers based on the lower control limit and upper control limit. The method further includes, deleting the outliers from the trigger data and/or determining the cause of the outliers. The method further includes, determining that the transactions of the triggers comprise a threshold amount; calculating a specific range of values for the transactions based on the threshold amount; determining that the value of at least one of the transactions falls outside of the specific range of values; and increasing or decreasing the threshold amount.

Also provided in the embodiments presented herein is a computer program product for monitoring trigger data quality associated with one or more accounts of a financial institution. The computer program product including: a computer readable storage medium having computer readable program code embodied therewith, the computer readable program code comprising: computer readable program code configured to receive account data associated with the one or more accounts; computer readable program code configured segregate the account data into one or more periods of time; computer readable program code configured to identify triggers associated with the one or more periods of time based on transactions that occur during the one or more periods of times; computer readable program code configured to calculate a total transaction count for each of the triggers; and computer readable program code configured to determine control limits based on the transaction count for each of the triggers. In some embodiments of the computer program product, computer readable program code configured to calculate a lower control limit as the difference of the trimmed mean of the transaction count and the standard deviation of the transaction count; calculate an upper control limit as the sum of the trimmed mean of the transaction count and the standard deviation of the transaction count; detect outliers in the trigger data based on the lower control limit and upper control limit; tag the outliers; and report the outliers to an analyst is provided.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein:

FIG. 13B provides a table illustrating trigger data quality monitoring in accordance with various embodiments of the invention; and FIGS. 14A-14J provide tables illustrating various triggers in accordance with various embodiments of the invention.

DETAILED DESCRIPTION

Figure 1:
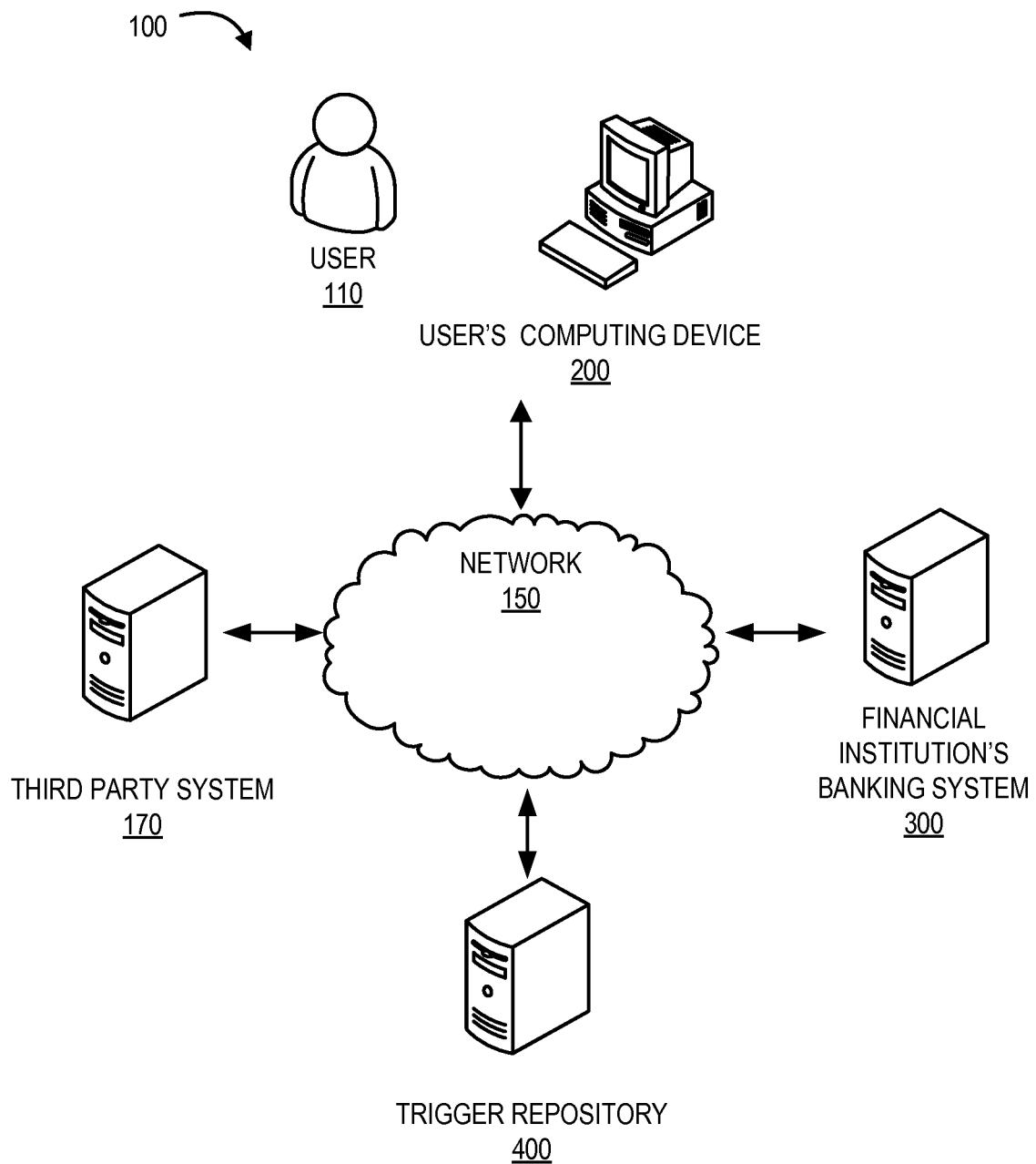
FIG. 1 provides a block diagram illustrating a trigger analysis system and environment in accordance with various embodiments of the invention.

The embodiments presented herein are directed to systems and methods for enhancing and maintaining customer relationships with an organization by the creation, institution, and management of account related triggers. In some embodiments, a system that supports ideation, sizing, design, production, and maintenance of triggers is provided. The system develops effective communication routines to aid in trigger delivery. Other embodiments are directed to monitoring data quality by checking historical volume and calculating high and low control limits to determine whether current volumes are in control. Such data quality monitoring minimizes false positives.

Other embodiments are directed to retaining users in their existing relationships with a financial institution. Based on account data, comparisons of past and current transactional activity are made and a slowdown in account usage is determined. In response to the determination, notifications are presented to the user to increase customer satisfaction and retain the customer relationship. Financial institutions find this approach desirable because it more cost effective and profitable to retain existing relationships than it is to acquire new customers.

Still other embodiments are directed to increasing transactional depth or account breadth. Incoming and outbound transactions are evaluated over a period of time to identify accounts that are close to a certain threshold. Users are notified of their account status and prompted to increase account activity in order to gain extra benefits. In this way, financial institutions are able to understand their customer's needs and cross sell products. In further embodiments, the relationship with the user is enhanced by timely identifying outside transactions through account review. For example, withdrawals, opening new accounts with a competitor, or making competitor payments are identified and reviewed to avoid losing the user to a competitor.

Further embodiments focus on providing new products to a user by indentifying inbound and outbound transactions that signify a change in account activity or relate to a particular type of transaction. Triggers related to payment types and increases in deposit amounts are identified to enable a financial institution to cross sell products to users.

In other embodiments, account information is reviewed to identify accounts that have unavailable funds and fixed costs and users are presented policy information. In this way, users are educated so that they can avoid fixed costs and are made aware of available options so that they can make informed decisions.

As will be appreciated by one skilled in the art, aspects of the present embodiments of the invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the invention are described below with reference to flowchart illustrations and/or block diagrams of methods, apparatus (systems) and computer program products according to embodiments of the embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As presented herein, embodiments that enhance and maintain customer relationships with a financial institution via financial account related triggers are provided. As used herein, the term "trigger" refers to, but is not limited to, account activity, transactional data, account costs, account terms and conditions associated with one or more financial accounts, and non-financial data such as online data. Exemplary triggers include transactions and/or events associated with various accounts, such as a checking account, savings account, credit card account, retirement account, investment vehicle, or other type of account. Non-financial exemplary triggers include referrals from an online domain and online cookies. Specific events or trends in account or online activity are used to accomplish various objectives in the support and maintenance of user accounts to thereby increase user satisfaction and account profitability.

Referring now to the figures, FIG. 1 provides a block diagram illustrating a trigger analysis system and environment 100, in accordance with an embodiment of the invention. The trigger analysis environment 100 includes a user 110, and an associated computing device 200. A user of the system may be an individual account holder, an agent of the account holder, a customer of a financial institution, or any other entity that is capable of maintaining a financial account. The computing device 200 may be any device that employs a processor and memory and can perform computing functions, such as a personal computer or a mobile device. As used herein, a "mobile device" is any mobile communication device, such as a cellular telecommunications device (i.e., a cell phone or mobile phone), personal digital assistant (PDA), a mobile Internet accessing device, or other mobile device.

The computing device 200 is configured to communicate over a network 150 with a financial institution's banking system 300 and, in some cases, a third party system 170, such as one or more other financial institution systems, a vendor's system, an online domain, a POS (point of sales) device, and the like. The user's computing device 200, the financial institution's banking system 300, and a trigger repository 400 are each described in greater detail below with reference to FIGS. 2-4. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

In general, the computing device 200 is configured to connect with the network 150 to log the user 110 into the financial institution's banking system 300, such as an online banking system. The computing device 200 is also configured to connect with the network 150 to allow the user 110 to access the third party system 170, such as an online domain. The banking system 300 involves authentication of a user in order to access the user's account on the banking system 300. For example, the banking system 300 is a system where a user 110 logs into his/her account such that the user 110 or other entity can access data that is associated with the user 110. For example, in one embodiment of the invention, the banking system 300 is an online banking system maintained by a financial institution. In such an embodiment, the user 110 can use the computing device 200 to log into the banking system 300 to access the user's online banking account. Logging into the banking system 300 generally requires that the user 110 authenticate his/her identity using a user name, a passcode, a cookie, a biometric identifier, a private key, a token, and/or another authentication mechanism that is provided by the user 110 to the banking system 300 via the computing device 200. The financial institution's banking system 300 is in network communication with other devices, such as the third party system 170 and the trigger repository 400.

In some embodiments of the invention, the trigger repository 400 is configured to be controlled and managed by one or more third-party data providers (not shown in FIG. 1) over the network 150. In other embodiments, the trigger repository 400 is configured to be controlled and managed over the network 150 by the same entity that maintains the financial institution's banking system 300. In other embodiments, the trigger repository 400 is configured to be controlled and managed over the network 150 by the financial institution implementing the trigger system of the present embodiments of the invention. In still other embodiments, the trigger repository 400 is a part of the banking system 300.

Figure 2:
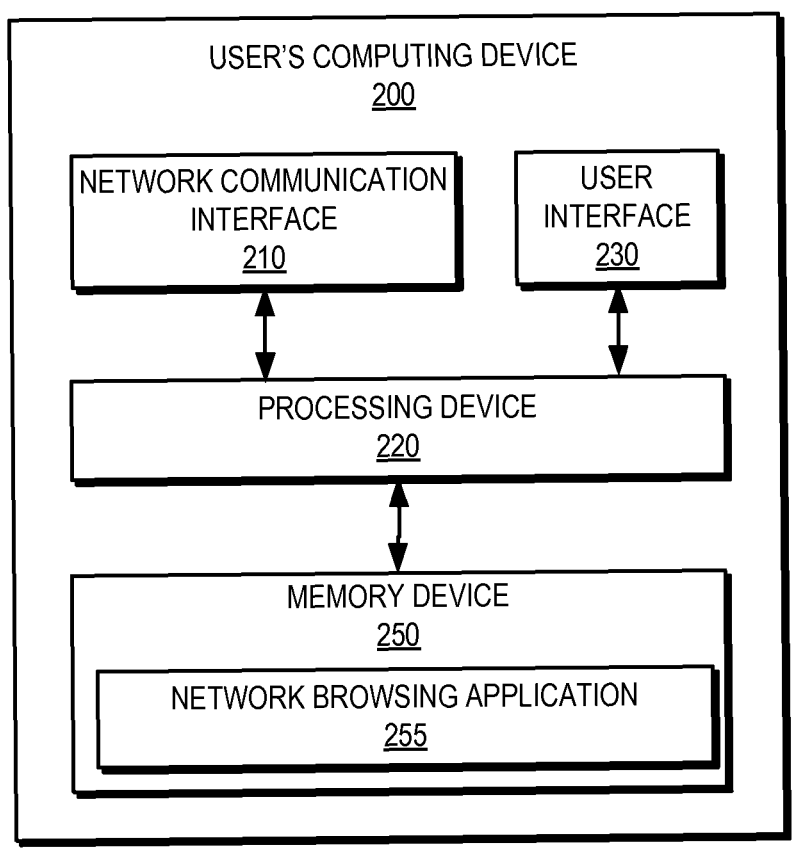
FIG. 2 provides a block diagram illustrating the user's computing device of FIG. 1, in accordance with various embodiments of the invention.

Referring now to FIG. 2, the computing device 200 associated with the user 110 includes various features, such as a network communication interface 210, a processing device 220, a user interface 230, and a memory device 250. The network communication interface 210 includes a device that allows the computing device 200 to communicate over the network 150 (shown in FIG. 1). In addition, a network browsing application 255 is stored in the memory device 250. The network browsing application 255 provides for the user to establish network communication with the banking system 300 (shown in FIG. 1) for the purpose of communicating account information to the banking system 300, in accordance with embodiments of the present embodiments of the invention.

As used herein, a "processing device," such as the processing device 220 or the processing device 320, generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 220 or 320 may further include functionality to operate one or more software programs based on computer-executable program code thereof, which may be stored in a memory. As the phrase is used herein, a processing device 220 or 320 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 230 generally includes a plurality of interface devices that allow a customer to input commands and data to direct the processing device to execute instructions. As such, the user interface 230 employs certain input and output devices to input data received from the user 110 or output data to the user 110. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" 250 or 350 generally refers to a device or combination of devices that store one or more forms of computer-readable media and/or computer-executable program code/instructions. Computer-readable media is defined in greater detail below. For example, in one embodiment, the memory device 250 or 350 includes any computer memory that provides an actual or virtual space to temporarily or permanently store data and/or commands provided to the processing device 220 when it carries out its functions described herein.

Figure 3:
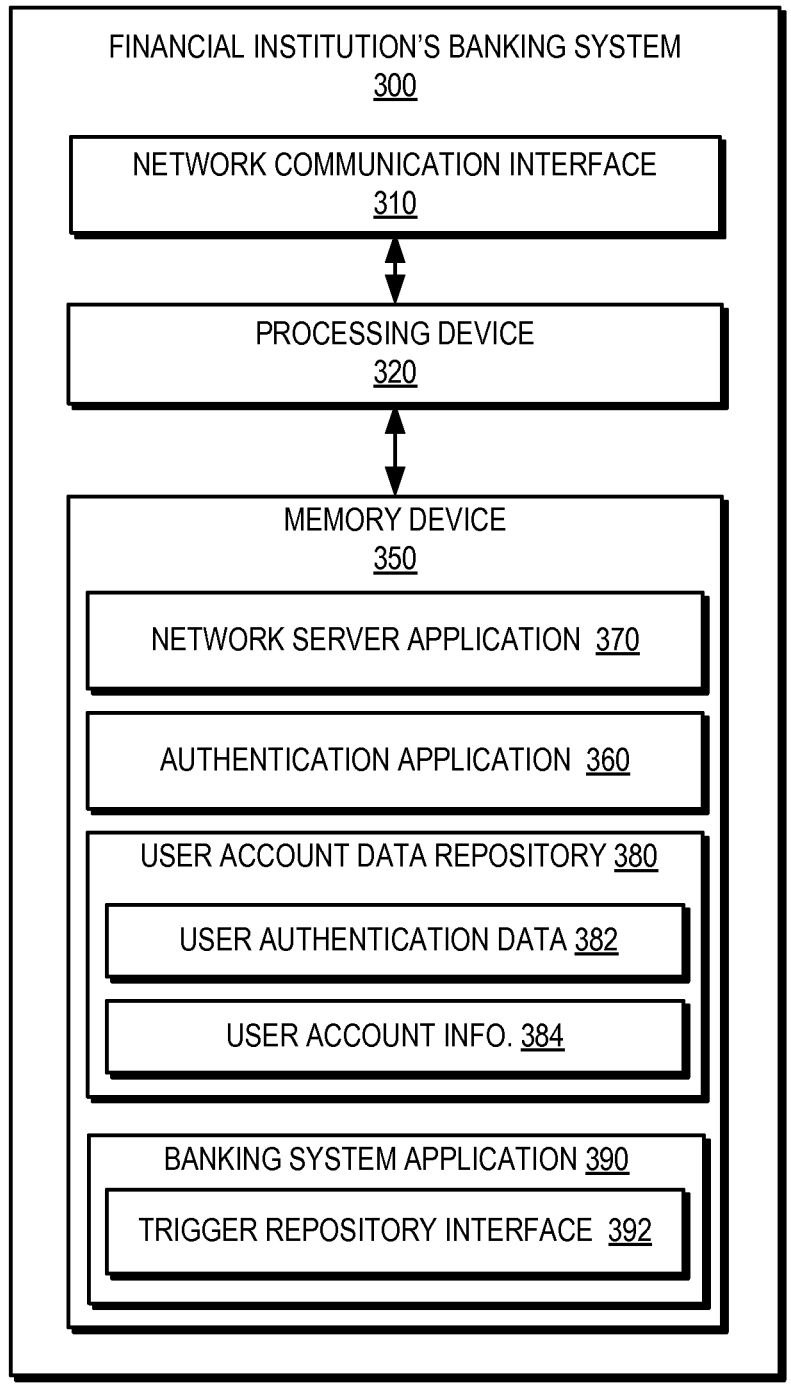
FIG. 3 provides a block diagram illustrating the financial institution's banking system of FIG. 1, in accordance with various embodiments of the invention.

FIG. 3 provides a block diagram illustrating the banking system 300 in greater detail, in accordance with embodiments of the invention. In one embodiment of the invention, the banking system 300 includes a processing device 320 operatively coupled to a network communication interface 310 and a memory device 350. In certain embodiments, the banking system 300 is operated by a first entity, such as a financial institution, while in other embodiments, the banking system 300 is operated by an entity other than a financial institution.

It should be understood that the memory device 350 may include one or more databases or other data structures/repositories. The memory device 350 also includes computer-executable program code that instructs the processing device 320 to operate the network communication interface 310 to perform certain communication functions of the banking system 300 described herein. For example, in one embodiment of the banking system 300, the memory device 350 includes, but is not limited to, a network server application 370, an authentication application 360, a user account data repository 380, which includes user authentication data 382 and user account information 384, and a banking system application 390, which includes a trigger repository interface 392 and other computer-executable instructions or other data such as a trigger software module. The computer-executable program code of the network server application 370, the authentication application 360, or the banking system application 390 may instruct the processing device 320 to perform certain logic, data-processing, and data-storing functions of the online system 700 described herein, as well as communication functions of the banking system 300.

In one embodiment, the user account data repository 380 includes user authentication data 382 and user account information 384. The network server application 370, the authentication application 360, and the banking system application 390 are configured to implement user account information 384 and the trigger repository interface 392 when monitoring the trigger data associated with a user account. The banking system application 390 includes a trigger software module for performing the steps of methods and systems 500-1100.

As used herein, a "communication interface" generally includes a modem, server, transceiver, and/or other device for communicating with other devices on a network, and/or a user interface for communicating with one or more customers. Referring again to FIG. 3, the network communication interface 310 is a communication interface having one or more communication devices configured to communicate with one or more other devices on the network 150, such as the personal computing device 200, the banking system 300, the third party system 170, and the trigger repository 400. The processing device 320 is configured to use the network communication interface 310 to transmit and/or receive data and/or commands to and/or from the other devices connected to the network 150.

Figure 4:
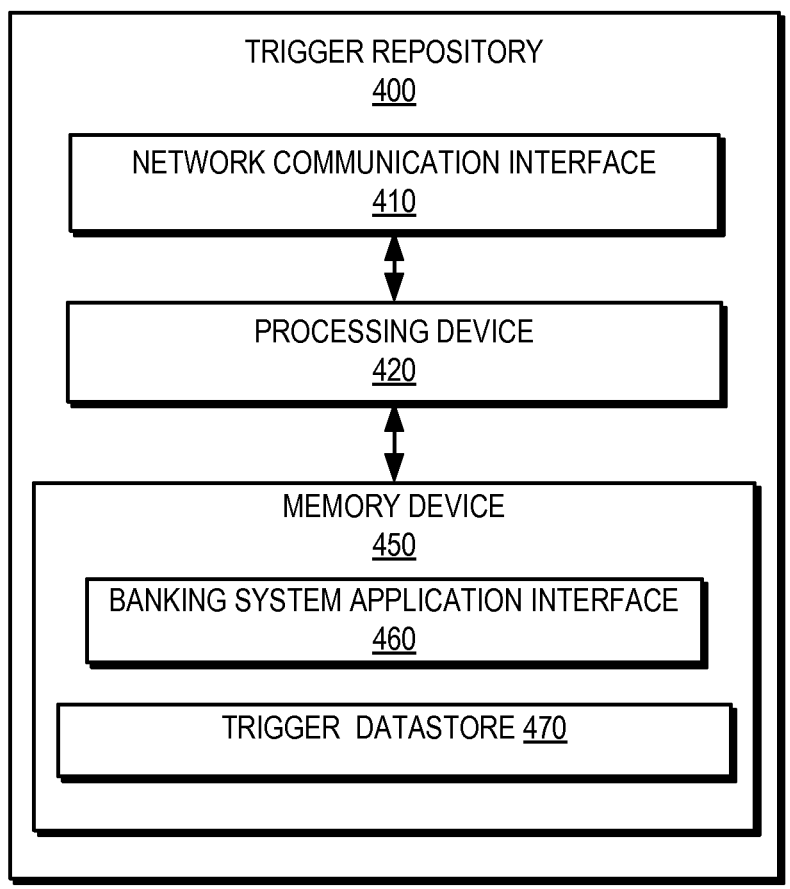
FIG. 4 provides a block diagram illustrating the trigger repository of FIG. 1, in accordance with various embodiments of the invention.

FIG. 4 provides a block diagram illustrating the trigger repository 400, in accordance with an embodiment of the invention. In one embodiment of the invention, the trigger repository 400 is operated by a second entity that is a different or separate entity from the first entity (e.g., the financial institution) that, in one embodiment of the invention, implements the banking system 300. In one embodiment, the trigger repository 400 could be part of the banking system 300. In another embodiment, the trigger repository 400 is a distinct entity from the banking system 300. As illustrated in FIG. 4, the trigger repository 400 generally includes, but is not limited to, a network communication interface 410, a processing device 420, and a memory device 450. The processing device 420 is operatively coupled to the network communication interface 410 and the memory device 450. In one embodiment of the trigger repository 400, the memory device 450 stores, but is not limited to, a banking system interface 460 and a trigger data store 470. The trigger data store 470 stores data including, but not limited to, triggers, account activity, including transaction and account costs for the user's financial institution account, other trigger related data, and mobile numbers or email address for the user's 110 account. In one embodiment of the invention, both the banking system interface 460 and the trigger data store 470 may associate with applications having computer-executable program code that instructs the processing device 420 to operate the network communication interface 410 to perform certain communication functions involving the trigger data store 470 described herein. In one embodiment, the computer-executable program code of an application associated with the trigger data store 470 may also instruct the processing device 420 to perform certain logic, data processing, and data storing functions of the application associated with the trigger data store 470 described herein. A trigger, as defined herein, is not limited to account activity, and may further include costs, policies, and conditions associated with an account and online data.

The network communication interface 410 is a communication interface having one or more communication devices configured to communicate with one or more other devices on the network 150. The processing device 420 is configured to use the network communication interface 410 to receive information from and/or provide information and commands to the user's computing device 200, the third party system 170, the trigger repository 400, the banking system 300 and/or other devices via the network 150. In some embodiments, the processing device 420 also uses the network communication interface 410 to access other devices on the network 150, such as one or more web servers of one or more third-party data providers. In some embodiments, one or more of the devices described herein may be operated by a second entity so that the third-party controls the various functions involving the trigger repository 400. For example, in one embodiment of the invention, although the banking system 300 is operated by a first entity (e.g., a financial institution), a second entity operates the trigger repository 400 that stores the trigger details for the customer's financial institution accounts and other information about users.

As described above, the processing device 420 is configured to use the network communication interface 410 to gather data from the various data sources. The processing device 420 stores the data that it receives in the memory device 450. In this regard, in one embodiment of the invention, the memory device 450 includes datastores that include, for example: (1) triggers associated with a user's financial institution account numbers and routing information, (2) information about sending and receiving users' mobile device numbers, email addresses, or other contact information, which may have been received from the banking system 300, and (3) online data such as browser cookies associated with the user's computing device 200.

Production and Maintenance of Triggers

Turning now to the production of triggers, in some embodiments, trigger ideas are formulated and undergo a preliminary review. The ideas may be formulated internally, such as by a team of analysts of a financial institution, or the ideas may be formulated externally by segment, channel, and marketing partners of a financial institution. The ideas are prioritized based on an opportunity analysis. For example, transaction channels, transaction categories, business names, amount thresholds, stability, and violation frequencies are selected to determine and quantify opportunities that can be generated from the trigger ideas. These opportunities, such as customer retention and policy education, may be analyzed in view of preferred, retail, and small business demographics. Based on the opportunity review, triggers are developed through rigorous testing. For example, tests may be conducted on transactions associated with a specific account or user. Further, triggers that are similar in scope and that overlap over the same time period may be monitored to further develop the trigger. The results of the testing may then be reviewed to finalize the triggers. In some embodiments, the triggers are modified for automation. For example, the code for automating the triggers may be embellished and specific parameters provided. In further embodiments, the automated triggers are monitored. For example, content and process quality trigger checks can be run on a daily, weekly, bi-weekly, and/or monthly basis.

Figure 5A:
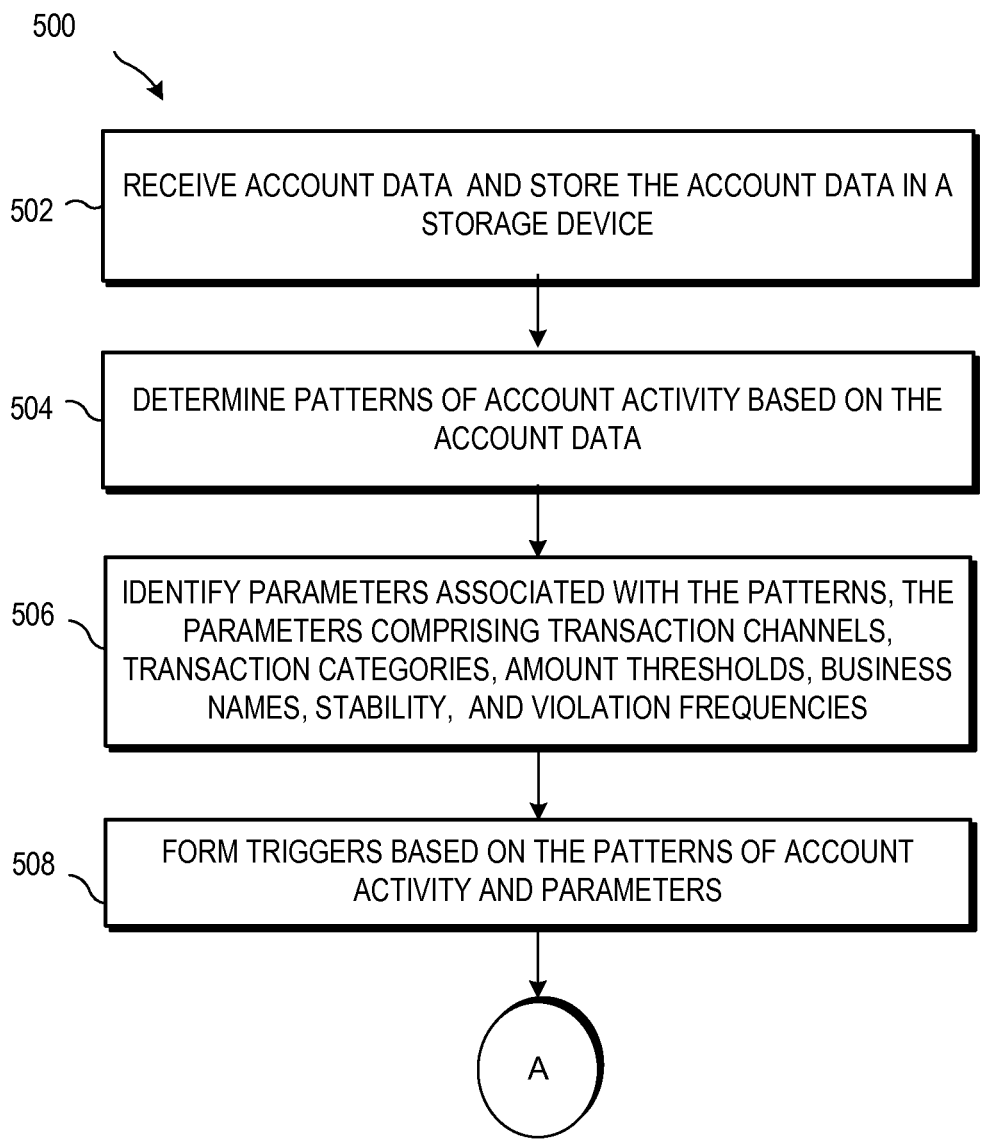
FIGS. 5A-5B are flowcharts illustrating a system and method for producing and maintaining triggers in accordance with various embodiments of the invention.
Figure 5B:
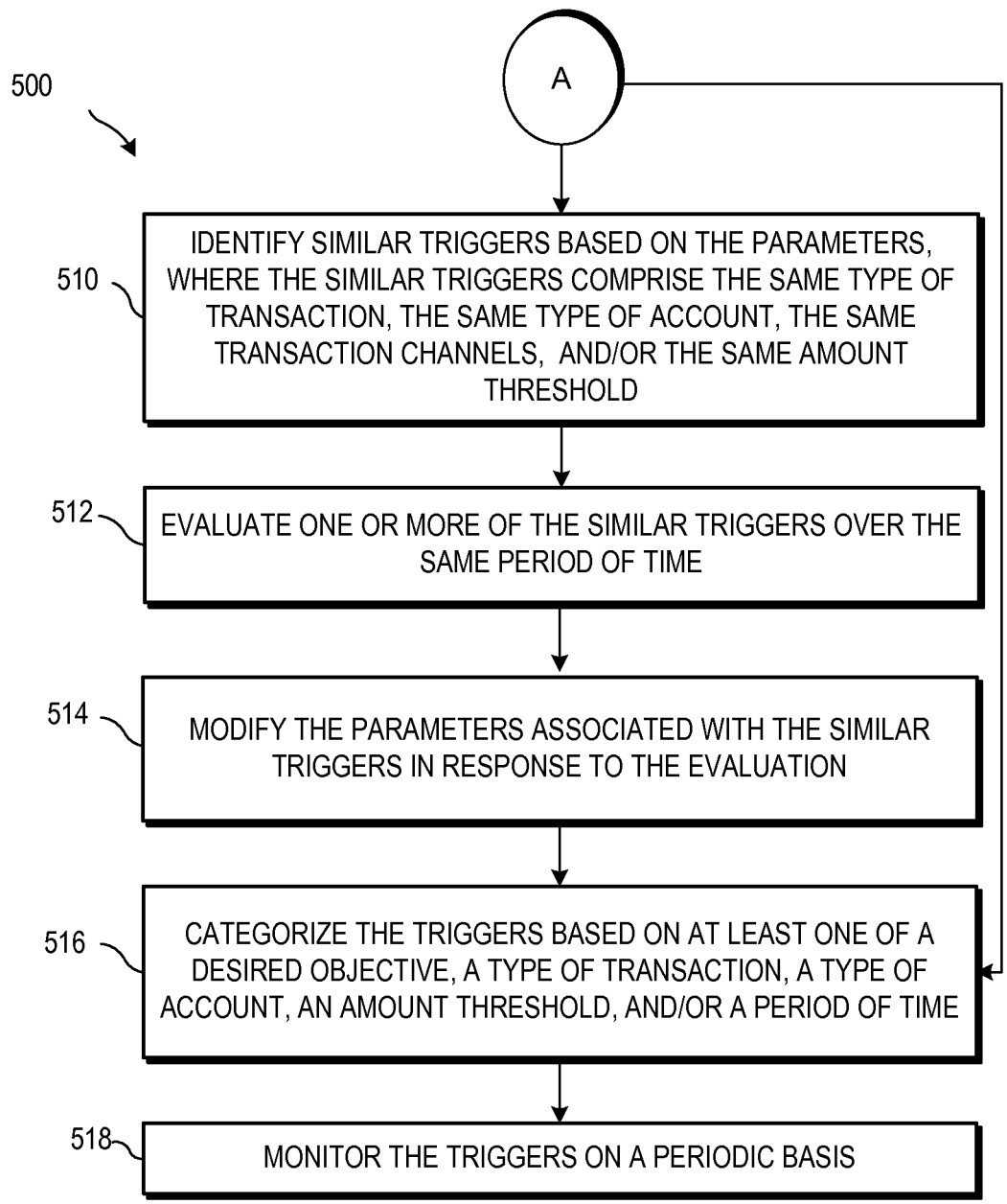

FIGS. 5A-5B are flowcharts providing an overview of a system and method 500 for producing and maintaining triggers. One or more devices, such as one or more mobile devices and/or one or more other computing devices and/or servers, can be configured to perform one or more steps of the method 500, as well as the methods 600-1100. In some embodiments, the one or more devices performing the steps are associated with a financial institution. In other embodiments, the one or more devices performing the steps are associated with a business, partner, third party, and/or user.

As shown in FIG. 5A, at block 502, account data is received and stored in a storage device (e.g., the user account data repository 380 or the trigger repository 400). A used herein, "account data" includes, but is not limited to any data associated with one or more financial accounts such as transaction amounts, inbound transactions, outbound transactions, transaction channels, transaction categories, transaction dates, identification of third parties to a transaction, payee names, purpose of transactions, transaction transfer data, types of accounts, costs associated with the account, account balances, and the like. The account data may be received from the user, merchants, other financial institutions such as credit card companies, or any other entity.

In block 504, patterns of account activity are determined based on the account data. The account activity, in some embodiments, is specifically linked to a transaction category, transaction type, transaction amount, or transaction channel. For example, algorithms may be used to detect upward or downward trends in the number of transactions, the amount of transactions, the occurrence of account costs, or other account activity over a period of time. Deposit amounts for a particular account, for example, may increase during the month of April for several years in a row and provide an indication that the account user has received a tax refund.

In block 506, parameters associated with the patterns are identified, where the parameters include transaction channels, transaction categories, amount thresholds, business names, stability, and violation frequencies. The parameters are identified, in some embodiments, by using algorithms, keywords, Boolean, transaction channel codes, transaction amount calculations, and threshold amounts to search the account data related to the patterns of account activity. The keywords include business names, merchant names, third party financial institution names, web addresses, transaction dates, transaction amounts, user identification, account identification, and the like.

Transaction channels include transaction processes such as electronic funds transfers, automatic deposits and withdrawals, ATM withdrawals and deposits, point-of-sale (POS) purchases, and the like. For example, triggers directed to deposit transactions may include transaction channel parameters such as teller deposits, ATM deposits, ACH deposits, internal transfers, automatic transfers, and pay roll transfers.

Transaction categories include transactions that are grouped according to a desired outcome or purpose. Exemplary transaction categories include user retention, increasing a user's transactional depth or account breadth, timely identification of outside transactions, new products, risk mitigation, policy education, and the like.

The amount thresholds include predetermined amounts associated with one or more transactions such as minimum and/or maximum percent, total, average, or median limits for quantities or values associated with one or more transactions. For example, some parameters may require that all purchases be over a minimum $100 limit and/or under a $10,000 limit. The stability parameters provide an indication of transactions that perform consistently over time, or an indication of transactions that have been adjusted to remove variations in activity over time. For example, the stability parameters may include a range of percentages, ratios, transaction amounts, and frequencies that fall within specific tolerances and that are linked to specific transactions that are tracked over time. Parameters of violation frequencies indicate the frequency of outliers, unexpected events, and negative results in account activity. For example, if the number of ATM withdrawals for a particular account has gradually decreased from six per month to one per month over the last seven months, seven ATM withdrawals on the same day of the current month would indicate a reversal in the trend and would be a violation of the trigger. The violation frequency can indicate an isolated occurrence which can be deleted or ignored from the data, or it can indicate a negative trend. Based on the violation frequency, the parameters of the triggers can be adjusted accordingly.

In block 508, triggers are formed based on the patterns of account activity and the parameters. In some embodiments, the patterns of account activity and the parameters are used to define the triggers. For example, a trigger may be defined by the total monthly number of ATM deposits that occur over a three month period. Further, the patterns of account activity provide the expected trend for transactions defined by the parameters. In the previous example, the trigger may be further defined by requiring that the total monthly number of ATM deposits decrease over the three month period. The patterns of account activity and parameters selected for each trigger may be based on the objective of the trigger. Triggers directed to cross selling investment products to user, for example, may include a pattern of increasing direct deposits in a saving account over a two week period. The triggers, and the patterns and parameters that define the triggers, may take on any number of variations. Specific exemplary triggers are described in more detail below with reference to FIGS. 14A-14J.

The method 500 is further illustrated in FIG. 5B. In block 510, similar triggers are identified based on the parameters, where the similar triggers comprise the same type of transaction, the same type of account, the same transaction channels, and/or the same amount threshold. In some embodiments, the similar triggers are associated with one or more accounts and/or one or more users. The similar triggers can be associated with a single account or user, or multiple accounts of the same or different users. For example, a similar trigger may include all payment transactions associated with a particular user, where the payment transactions include use of a credit card, a checking account, or other account. In further embodiments, the similar triggers are identified based on a transaction category.

In block 512, one or more of the similar triggers are evaluated over the same period of time. The evaluation of the similar triggers over the same time periods strengthens the trigger data such that any potential flaws, improvements, or strengths in the data are highlighted. In one example, electronic fund transfers associated with multiple accounts are monitored every day over the same six month period. In this way, the number of times the trigger should be run in a week or month, the days of the week for running the trigger, and any discrepancies in the data that occur during particular days of the week, weeks of the month, and months of the year are determined. In some embodiments, a first group of similar triggers is compared to a second group of similar triggers. For example, a group of similar outbound transaction triggers may be compared to a group of similar inbound transaction triggers. In another example, automatic deposits that occur on Mondays may be compared to automatic deposits that occur on Fridays.

In block 514, the parameters associated with the similar triggers are modified in response to the evaluation of the one or more of the similar triggers over the same period of time. One or more of the parameters for a particular trigger can be added or removed and/or the terms of the parameters can be adjusted. Holidays and weekends, for example, may cause discrepancies in the preliminary trigger data and may be taken into account when defining the trigger. Even after the triggers are preliminarily established, the triggers may be continuously monitored on a regular basis as discussed in more detail below with regard to FIGS. 6A-6B.

In block 516, the triggers are categorized based at least on one of a desired objective, a type of transaction, a type of account, an amount threshold, and/or a period of time. In some embodiments, a first group of similar triggers and a different second group of similar triggers are categorized based on the desired objective. For example, ATM deposits may be categorized with payments for education if the purpose of the triggers is to offer the user a loan with a lower interest rate. The triggers categorized according to the desired objective are further categorized according to the type of transaction, the type of account, the amount threshold, and the period of time. In the example above, the ATM deposits used as triggers for the purpose of loan offers may be further categorized according to the amounts of the deposits. In block 518, the categorized triggers are monitored on a period basis, as discussed in further detail below with regard to FIGS. 6A-6B.

Monitoring Trigger Data Quality

Figure 6A:
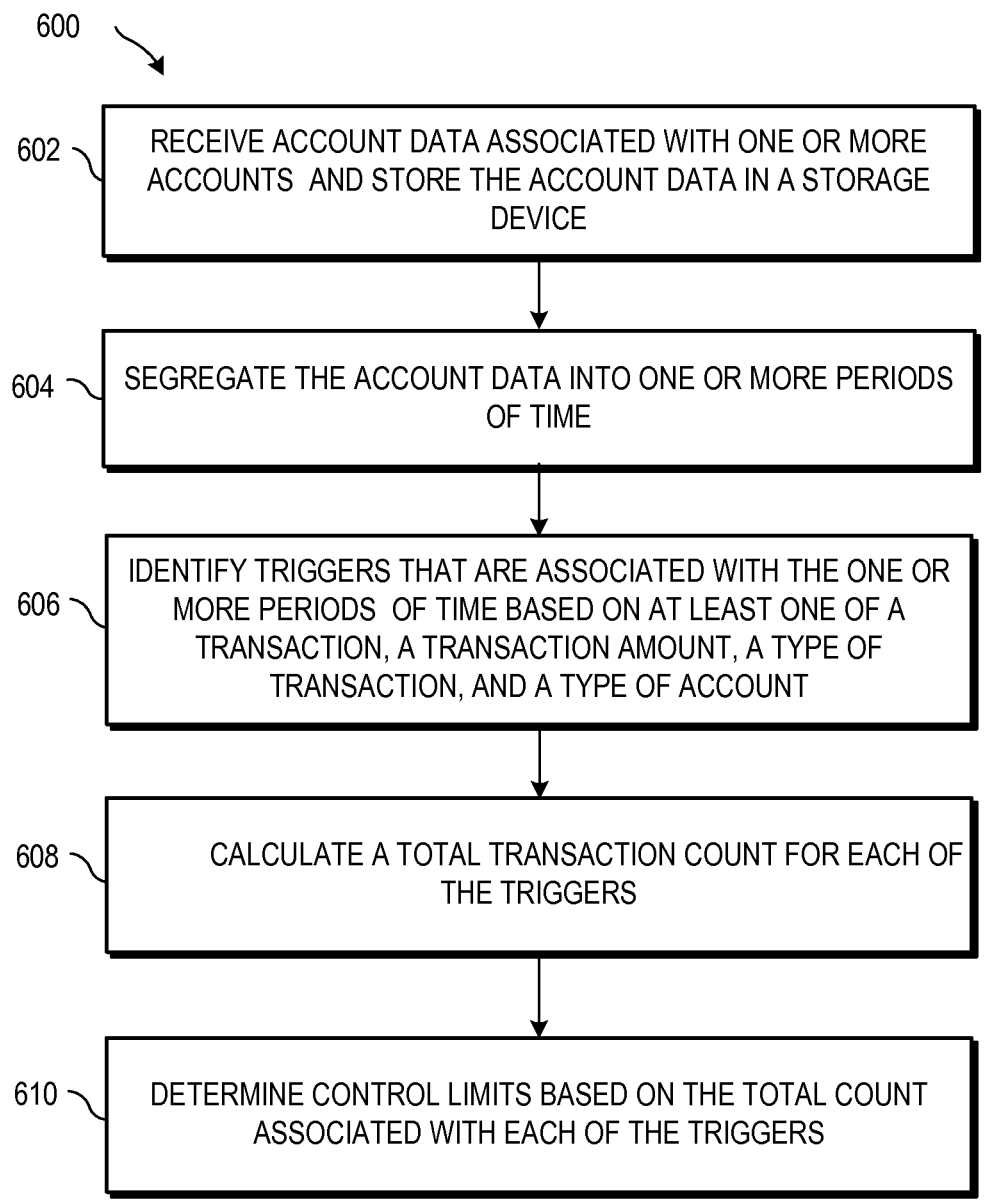
FIGS. 6A-6B are flowcharts illustrating a system and method for monitoring trigger data quality in accordance with various embodiments of the invention.
Figure 6B:
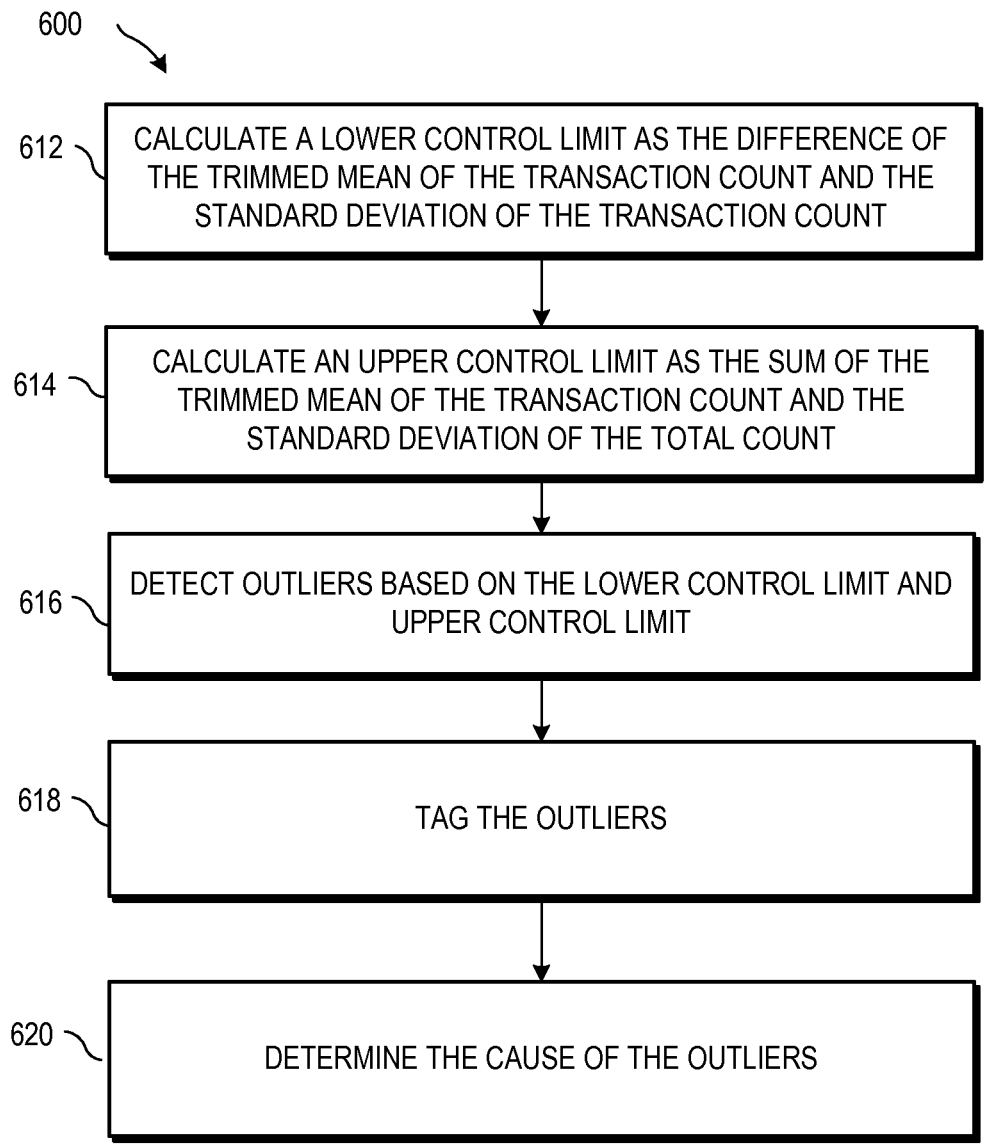

Referring now to FIGS. 6A-6B, flowcharts providing an overview of a system and method 600 for monitoring trigger data quality are provided. Because triggers have a very short life span, poor quality of data can lead to ineffective marketing and/or loss in revenue. The method 600 ensures that the right data is included in the triggers and detects potential definitional and process flaws in the triggers. The method 600 detects and reports whether the current trigger counts are normal or flawed in real time. The method 600 monitors the triggers to determine the accuracy, completeness, domain of values, and format of the trigger data. The triggers are further monitored to determine the relevance of the trigger metrics within a business context and explain how the metric score correlates to business performance. Also, the method 600 evaluates the soundness of all transformation processes, such as the categorization of the triggers.

In block 602 of FIG. 6A, account data associated with one or more accounts is received and stored in a storage device (e.g., the user account data repository 380 or the trigger repository 400). In block 604, the account data is segregated into one or more periods of time. For example, transactions may be divided into daily, weekly, monthly, quarterly, or yearly periods. The periods of time selected for segregating the account data are based on historical trends in the data. If deposits over $5,000 occurred only once per month over the last ten months, for example, then the data for such deposits would be segregated into monthly periods. By clustering data into specific time windows, seasonal, cyclic, and trend effects can be pinpointed as further discussed below with regard to FIG. 13A.

In block 606, triggers associated with the one or more periods of time are identified based on at least one of a transaction, a transaction amount, a type of transaction, and a type of account. In some embodiments, each set of triggers corresponding to transactions of a certain amount, and/or type are identified first and then the triggers are segregated into time periods. The triggers may be further identified based on a category corresponding to a desired objective. In some embodiments, the triggers are identified based on transactions that occur during the one or more periods of time. For example, a trigger may include all inbound transactions that have values that are greater than a threshold amount and that occur during the month of July.

In block 608, a total transaction count for each of the triggers is calculated. The transaction counts include value amounts for certain transactions associated with one or more accounts or the total number of certain transaction associated with the one or more accounts. In some embodiments, the transaction count is the total number of transactions that occur during the one or more period of time and that are associated with a particular trigger.

Figure 13A:
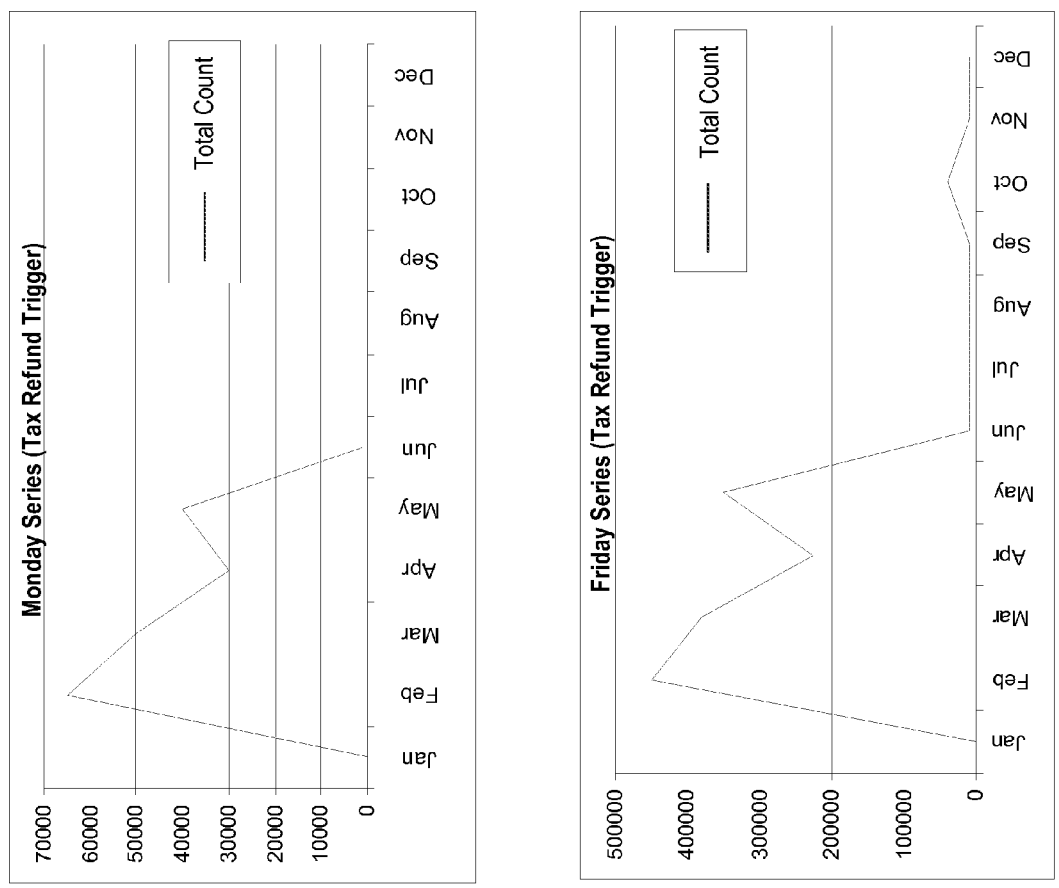
FIG. 13A provides graphical charts illustrating trigger data quality monitoring in accordance with various embodiments of the invention.

Exemplary graphical charts of total counts for a tax refund trigger are illustrated in FIG. 13A. In the Monday Series chart, the total transaction counts associated with tax refund triggers for the Mondays of every month of a particular year are charted. In the Friday Series chart, the total transaction counts associated with tax refund triggers for the Fridays of every month for the same particular year are charted. The data for Monday tax refunds can be compared to data for Friday tax refunds. The transaction counts for tax refund triggers during the months of February, March, April and May are much higher than the transaction counts for tax refunds during the rest of the year. And as shown in the Friday Series and Monday Series charts, the number of tax refunds is much higher on average for the Fridays in February to May than they are for the Mondays of the same period. Based on this data, the timing for sending users notifications of investment opportunities and product offers, for example, can be finely tuned such that the user receives offers at the most opportune times.

In block 610, control limits based on the transaction count for each of the triggers is determined. The control limits are calculated based on trimmed mean and standard deviation. Trimmed mean is calculated by removing a certain percent from the lowest percent of values and an equal certain percent from the highest percent of values in a give data series before calculating the mean. In calculating the trimmed mean, some of the lower numbers of the transaction count and some of the higher numbers of the transaction count are removed before the mean is calculated. For example, tax refund transactions that occur on a Friday and that have a value that is a certain percent higher or lower than the median for all tax refunds that occur on the same Friday are deleted before the mean is calculated.

FIG. 6B is a flowchart further illustrating the method and system 600. In block 612, a lower control limit is calculated as the difference of the trimmed mean of the transaction count and the standard deviation of the transaction count. In block 614, an upper control limit is calculated as the sum of the trimmed mean of the total count and the standard deviation of the total count. In block 616, outliers are detected based on the lower control limit and the upper control limit.

An exemplary table illustrating the transaction count and control limits is shown in FIG. 13B. The issue tracking table shows Trigger-1, Trigger-2, and Trigger-3, which are listed according to the date and the week day on which they occur. A lower control limit (LCL), a transaction count, and an upper control limit (UCL) are calculated daily for each trigger. The transaction count is the total number of transactions that occur for each of the Triggers 1-3 in a given day. Although a daily trigger data quality check is illustrated, it will be understood that the trigger check may be run on a weekly, monthly, or other time period basis. The LCL and UCL indicate whether a particular trigger is an outlier or a normal trigger. For example, Trigger-1 on Thursday, December 1 is tagged with an outlier alert based on the LCL and UCL numbers. The normal LCL for Trigger-1 on Thursday, December 8 is higher than the outlier LCL on December 1, and the normal UCL is lower than the outlier UCL on December 1. For triggers tagged as normal, the LCL and UCL remain constant from period to period. As shown in the table, normal Trigger-2 on Friday, December 2 and normal Trigger-2 on Friday, December 9 each has the same LCL and UCL numbers even though the total count for each day is different.

In block 618, the outliers are tagged. The outliers may be tagged as "outlier" as illustrated in the exemplary table of FIG. 13B or "fail" and suppressed automatically. In some embodiments, alerts are sent to analysts. For example, reports, graphs, tables, or other notifications may be sent to analysts for further processing. The analysts may decide to segregate, delete, modify, or retain the tagged or untagged trigger data. For example, one or more transactions associated with a particular trigger may be deleted and the transaction count recalculated for that particular trigger. In other embodiments, the triggers that exhibit a normal pattern and that are within confidence limits are tagged as "normal" or "pass."

In block 620, the cause of the outliers is determined. Periods of time around holidays, cyclic considerations such as tax season, days of the week, weeks of the month, certain historical trends, data obtained from the user, and external data can indicate the cause for the outliers. For example, historical trends may indicate that the number of mortgage payments is higher at the end of the month than at the beginning of the month and the number of ATM withdrawals may be higher on Fridays than it is on Tuesdays. As another example, triggers that include transactions having a specific threshold amount of $10 or greater may have a higher number of transactions during a particular period because a greater number of low end transactions (e.g., transaction of $10 to $12) occur during that period. Based on the cause of the skewed data, appropriate action can be taken. For example, the threshold amount or some other parameter associated with the trigger may be modified or certain triggers associated with a particular day of the week or other period may be tagged as normal even though these certain triggers would appear to be abnormal. Taking the $10 or greater trigger example described above, for example, the threshold amount for that trigger may be increased during the particular period or marked as normal. If the cause of the outliers is not easily explained or if the cause is unexpected, then further investigation may be required.

Although the triggers described herein generally include financial transactions associated with one or more accounts, such as the triggers illustrated in FIGS. 14A-14J, it will be understood that the triggers may also include non-financial data such as online data. For example, online referrals from an online domain or partner website may be used as triggers. A user, in one example, may be referred to or redirected to a banking website or online product from a student preparatory web site. In another example, a system may be given permission to use browser cookies associated with the user's device to track non-financial and/or financial online activity.

User Retention

Figure 7:
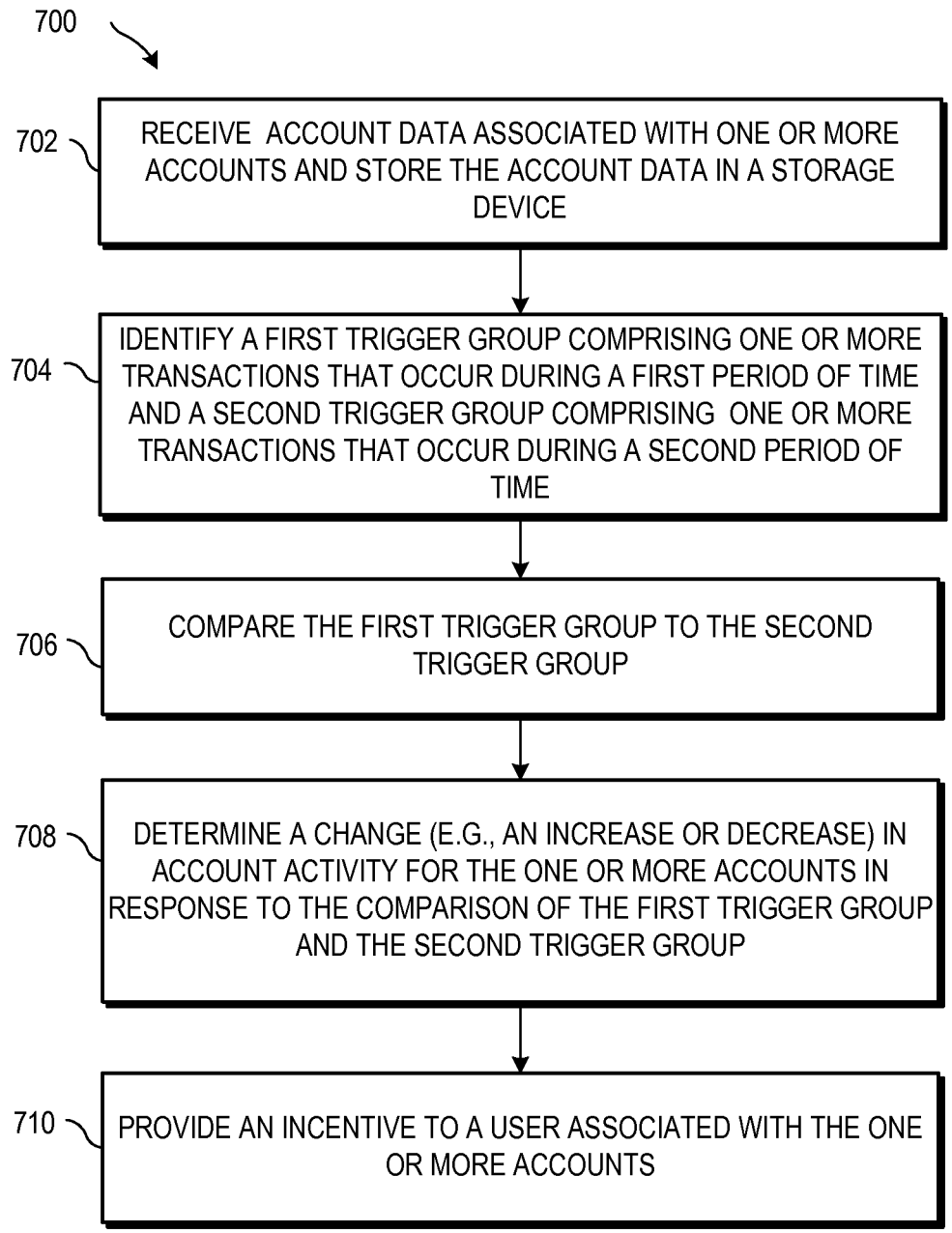
FIG. 7 is a flowchart illustrating a system and method for retaining users in accordance with various embodiments of the invention.

FIG. 7 is a flowchart providing an overview of a system and method 700 for retaining users in their existing relationship with a financial institution are provided. Based on past and current account activity, a decrease in account activity such as a slowdown or stoppage of direct deposits, reductions in deposit patterns, or slowdown in payments using specific accounts is identified. The system and method 700 is a cost effective and profitable strategy because it costs must less to retain customers than to acquire new ones.

In block 702, account data associated with one or more accounts are received and the account data is stored in a storage device (e.g., the user account data repository 380 or the trigger repository 400). In block 704, a first trigger group comprising one or more transactions that occur during a first period of time and a second trigger group comprising one or more transactions that occur during a second period of time are identified. In some embodiments, the first period of time is different and separate from the second period of time, while in other embodiments, at least a portion of the first period of time overlaps with at least a portion of the second period of time. For example, the first period of time may include a current month and the second period of time may include a previous month, or the first period of time may include the first two weeks of a particular month and the second period of time may include the entire four weeks of the same month. The trigger groups may be further identified based on an amount, a transaction channel, an account type, and the like.

Exemplary trigger relating to the system and method 700 are illustrated in Trigger Table 1 of FIGS. 14A-14B. In some embodiments, the triggers described herein are categorized and labeled based on an event, objective, or transaction. For example, all of the triggers in Table 1 are grouped together because they each have same objective of user retention. Triggers relating to deposit reductions are grouped and labeled according to a period of time or type and transaction channel. The transaction channels for the deposit reduction triggers (DR1, DR2, DRA, DRT) include checking and savings accounts. The transaction channels for payment/purchases (PP1 and PP3) include ACH, ATM, bill pay, credit card, debit card, checking, and teller transaction channels and include category of purchases such as loans, mortgages, and the like. For payment reduction trigger (PRT), transaction channels include ACH (automated clearing house), bill pay, debit card, and checking and payment categories include auto loans, mortgages, and utilities.

In block 706, the first trigger group is compared to the second trigger group. For example, various deposit trigger illustrated in Trigger Table 1 of FIG. 14A compare deposit groups. A "deposit reduction 1" trigger (DR1) runs on the $8^{th}$ calendar day of every month and identifies a pattern for the beginning of the current month and the end of the previous month incoming deposits while a "deposit reduction 2" trigger (DR2) runs on the $22^{nd}$ calendar day of every month and identifies end of the current month incoming deposits. The difference of the total value or total number of deposits for DR1 and the total value or total number of the deposits for DR2 can be calculated to determine that the total value or total number of the DR1 deposits is greater than the total value or total number of the DR2 deposits. Moreover, the pattern identified in DR1 may identify a pattern of decreased activity where the value or number of deposits that occur at the beginning of the current month are lower than the value or number of deposits that occur at the end of the previous month. Similarly, the triggers relating to outgoing ACH (automated clearing house) transactions and payment and purchase reductions of the Trigger Table 1 in FIGS. 14A-14B calculate the trend in account activity by comparing transactions that occur in different time periods.

Although only two periods of time are illustrated in the FIG. 7, it will be understood that any number of period of time can be identified and compared. For example, the outbound ACH triggers are segmented according to four periods of time (see, FIGS. 14A-14B). ACH transactions include electronic funds transfers, payment transfers, credit and debits transfers, or any transactions associated with an electronic financial institutions transfer network. OA1 provides outgoing ACH transaction counts for the current month, OA2 provides counts for the first month of the three month stability period, OA3 provides counts for the second month of the stability period, and OA4 provides counts for the third month of the stability period. OA1-OA4 are then used in calculations for the "Outgoing ACH drop" (OAD) and "Outgoing ACH stop" (OAS) triggers. Various payment related triggers also use different periods of time to determine account activity. A "Current month payment/purchase" trigger (PP1) provides the current month transaction amount and transaction count and "Previous 3 month avg. payment/purchase" trigger (PR3) provides the previous three month average transaction account and transaction count (see, FIG. 14B). The PP1 and PR3 triggers are used in calculating a "Payment and purchase reduction" trigger (PPR) as discussed below.

In block 708 of FIG. 7, a change in account activity for the one or more accounts in response to the comparison of the first trigger group and the second trigger group is determined. In one embodiment, a decrease in account activity for the one or more accounts in response to the comparison of the first trigger group and the second trigger group is determined. In other embodiments, an increase in account activity for the one or more accounts in response to the comparison of the first trigger group and the second trigger groups is determined. The "deposit reduction for credit card users" trigger (DRT) and the "deposit reduction trigger for all users" trigger (DRA) in FIG. 14A indicate a decrease in monthly deposits over a three month period. As described above, calculations for the deposits of DR1 and/or DR2 are undertaken to determine a decrease in deposits. The outgoing ACH triggers also calculate decreases in account activity based on calculations using OA1-OA4 (see, Trigger Table 1, FIGS. 14A-14B). For OAD, the calculations of OA1 and OA2-4 are used to determine that the current month (monitoring period) count number is less than or equal to 50% of the average number of transactions in the previous three months (stability period), where the average number of transactions in the stability period is greater than or equal to 3. If the OA1 outbound transaction count is between 0 and 50% of the average number of OA2, OA3, and OA4 transactions, then OAD is tripped. For OAS, the current month (monitoring period) count number is equal to 0 and the number of transactions in the stability period is greater than or equal to 3. If the OA1 outbound transaction count is 0% of the average number of OA2, OA3, and OA4 transactions, then OAS is tripped.

Referring again to FIG. 14B, PPR and PRT of Trigger Table 1 indicate decreases in deposit amounts over a period of time. For PPR, the difference of the number of payment transactions from PP1 and the average number of payments from PP3 is calculated as greater than or equal to 10. And, the difference of the total payment amount from PP1 and the average amount of PP3 is calculated to be greater than or equal to $1,500. Also for PPR, the total payment amount from PP1 is less than or equal to 50% of the average amount from PP3. Further, PRT compares payments of the previous two month for purchases in key necessity categories to determine that such payments have decreased over the two month period. Key necessity categories include auto loans, mortgages, and utilities.

In addition to detecting decreases in account activity, triggers can also be used to detect account maintenance costs in order to retain users. Trigger Table 1 illustrates various maintenance costs (see, FIG. 14A). For a "First time monthly maintenance-daily" trigger (FMD), accounts that have incurred a first time monthly maintenance cost in the last six months are identified by running trigger checks every day. "First time monthly maintenance-weekly" (FMT) runs such trigger checks on a weekly basis. Further, "Monthly maintenance fee" (MTH) determines checking and savings account that incur monthly maintenance costs.

Referring back to FIG. 7, in block 710, an incentive is provided to a user associated with the one or more account. The incentive includes product and service offers, account modifications, recommendations, counseling, and the like. For example, for accounts that have incurred a monthly maintenance costs for the first time during the life of the account or during a certain time period (e.g., six months), a cost waiver may be applied to the account. This is to ensure that users who usually do not incur such account costs or who mistakenly incurred the costs are dissuaded from closing or decreasing usage of the account. Users having accounts that have the potential to incur maintenance costs, in some instances, are informed of the account policy to prevent maintenance costs in the future and/or are offered a different type of account to better suit their needs. Users that have accounts that regularly have maintenance costs (e.g., monthly maintenance costs) can be offered account modifications such as a lower balance threshold or a higher interest rate. In other embodiments, incentives for accounts that have a decrease in account activity such as deposit decreases, outbound ACH decreases, or payment decreases, include account upgrades, service upgrades, account costs waivers, credit card offers, rewards, and/or account interest rate adjustments.

Increasing Transaction Depth and Account Breadth

Figure 8:
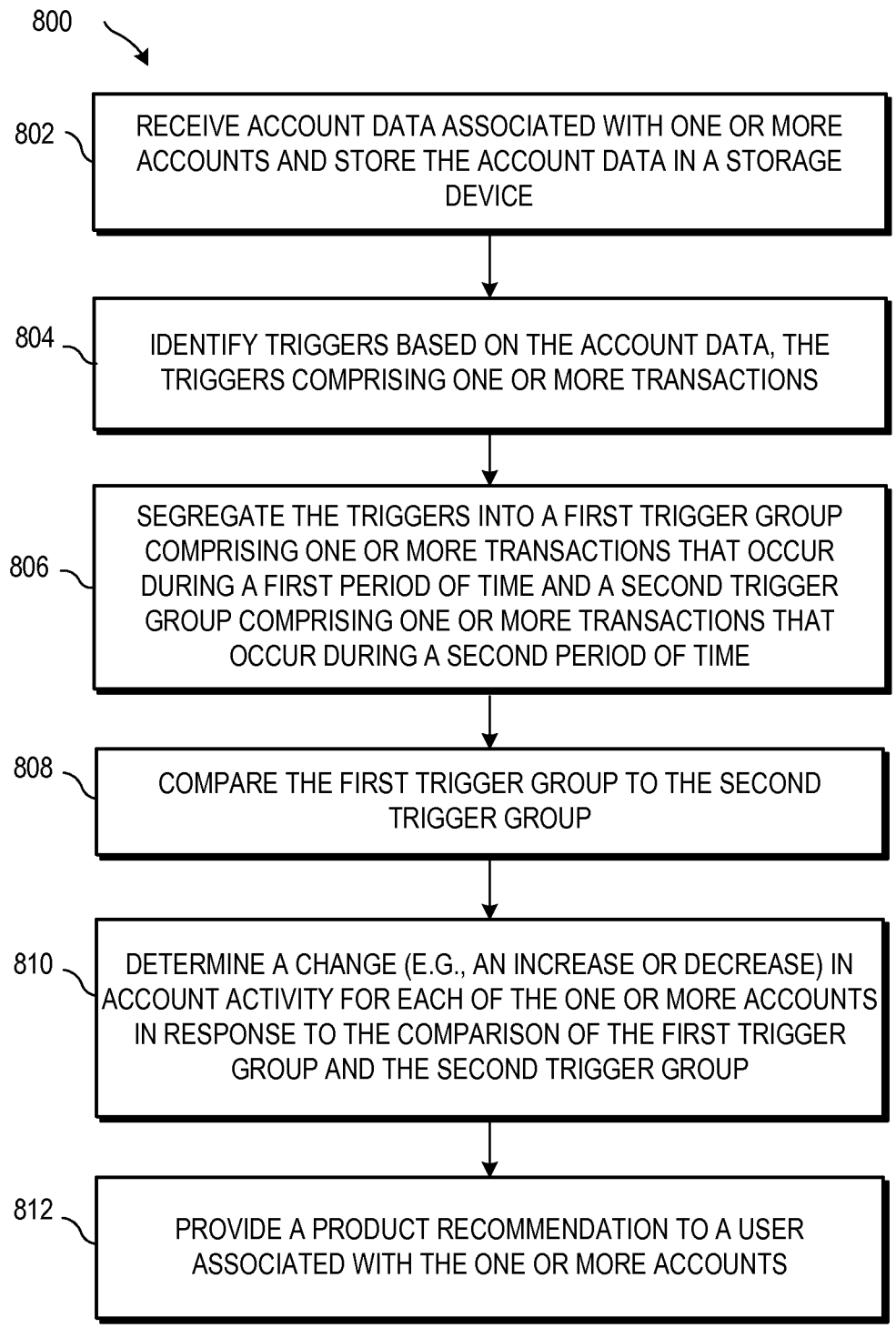
FIG. 8 is a flowchart illustrating a system and method for increasing a user's transactional depth or account breadth in accordance with various embodiments of the invention.

FIG. 8 is a flowchart providing an overview of a system and method 800 for increasing transaction depth and account breadth. The system and method 800 target "on the edge" accounts that are associated with positive account activity but that are not classified in profitable segments. A complete picture of a user's needs is captured through the method 800 to increase the effectiveness of product cross selling for the mutual benefit of the user and the financial institution. The method 800 deepens transactional depth and account breadth to consolidate the relationship with the user and gain a larger share of the user's financial business.

In block 802, account data associated with one or more account are received and the account data is stored in a storage device (e.g., the user account data repository 380 or the trigger repository 400). In block 804, triggers are identified based on the account data, the triggers comprising one or more transactions. Trigger Table 2 of FIGS. 14C-14D provides several exemplary triggers that include inbound transactions, ACH deposits, ATM deposits, teller deposits, inbound internal transfers, outbound internal transfers, and direct deposit pay.

In block 806, the triggers are segregated into a first trigger group comprising one or more transactions that occur during a first period of time and a second trigger group comprising one or more transactions that occur during a second period of time. For example, the triggers in Trigger Table 2 of FIGS. 14C-14D include various time periods. In some embodiments, the first period of time overlaps with at least a portion of the second period of time. The trigger relating to "No ACH deposit but either ATM or teller deposits" (ATT) includes periods of time (i.e., the last two months) that completely overlap for a first trigger category of ACH deposits and a second trigger category of ATM or teller deposits. In other embodiments the first period of time and the second period of time are different and do not overlap. For example, a "No ATM withdrawals in the second last month but had ATM withdrawals in the last month" trigger (AWL) includes trigger groups segregated into a first previous month and a second previous month (see, FIG. 14D). Similarly, FIG. 14D also shows an "ATM deposits" trigger (NAD) where no ATM deposits where made in the second last month, but ATM deposits were made in the last month.

Although only two periods of time are illustrated in the FIG. 8, it will be understood that any number of period of time can be identified and compared. For example, in Trigger Table 2 of FIGS. 14C-14D, the triggers directed to inbound internal transfers (IXF) and outbound internal transfers (OXF) include three different time periods, e.g., a third previous month, a second previous month, and a first previous month.

In other embodiments, the triggers are further defined based on the value or number of the transactions that are above a threshold amount. Trigger Table 2 of FIGS. 14C-14D provides several exemplary triggers that include specific amounts criteria. For example, ATT includes zero ACH deposits and at least one ATM or teller deposit. For "Monthly deposit increase for engaged users" trigger (IGT), inbound transactions are greater than $50. For various other triggers in Trigger Table 2, the triggers may include a count of zero for some transaction and a count of at least one for other transactions.

Referring again to FIG. 8, in block 808, the first trigger group is compared to the second trigger group. And in block 810, a change in account activity for each of the one or more accounts in response to the comparison of the first trigger group and the second group is determined. In one embodiment, an increase in account activity for each of the one or more accounts in response to the comparison of the first trigger group and the second trigger group is determined. In other embodiments, a decrease in account activity for each of the one or more accounts in response to the comparison of the first trigger group and the second trigger groups is determined. In the Trigger Table 2 of FIG. 14 C, for ATT, ACH deposits that occurred during the last two months are compared to ATM or teller deposits over the same two month period to determine that zero ACH deposits and at least one ATM or teller deposits occurred during the last two months. For AWL and NAD, inbound or outbound ATM transactions in the second last month are compared to inbound or outbound ATM transaction in the last month to determine that zero ATM deposits or withdrawals occurred in the second last month and that at least one ATM deposits or withdrawals occurred in the last month. For example, if the current month is May, AWL is triggered when it is determined that zero ATM withdrawals occurred in March and at least one ATM or teller withdrawal occurred in April.

For IXF and OXF of Trigger Table 1 (FIG. 14D), inbound internal transfers or outbound internal transfers in the third last month and second last month are compared to inbound internal transfers or outbound internal transfers in the last month to determine that zero inbound internal transfers or outbound internal transfers in the third last and second last month and that at least one inbound internal transfer or outbound internal transfer occurred in the last month. An outbound internal transfer occurs when, for example, funds from a saving account associated with a financial institution are moved to a checking account of the same financial institution and such funds are then used to make a payment, a withdrawal, or some other type of outbound transfer. An inbound internal transfer occurs when, for example, funds from a third party such as an employer or insurance company are transferred to a checking account associated with a financial institution and such funds are then moved to an investment vehicle associated with the same financial institution.

In some embodiments, the value of the one or more transactions is greater than a threshold amount. In the Trigger Table 2 of FIG. 14C, IGT includes inbound transactions that have values greater than $50. IGT is triggered when the total value of all inbound transactions greater than $50 in the current month is higher than the total value of all inbound transactions greater than $50 of the previous month by a minimum of 20%. The "direct deposit pay" trigger (DDP), includes direct deposit inbound transaction that occur during a period of time, e.g., a week, a month, six months, etc. The direct deposits may be identified, for example, based on a specific threshold amount, historic trends in account data, and identified terms associated with the inbound transactions. For example, inbound transactions may be tracked over a one year period to determine that certain automated inbound transaction occur on a bimonthly basis and are associated with the user's employer. DDP may be triggered when there is a change in direct deposit pay, such as an increase or decrease in the value of the pay, a change in employer name, and/or a change in the timing, frequency, or number of the direct deposit pay transactions.

In block 812 of FIG. 8, a product recommendation is provided to a user associated with the one or more accounts. The product recommendation includes recommendations for an account upgrade, an account modification, a different type of account, a savings or investment opportunity, a service, account usage advice, and the like. For example, a recommendation to set up automatic electronic transfers, such as payroll transfers, may be sent to users having accounts that have triggered ATT or NAD. For users associated with accounts triggered by IGT, an upgrade to a higher interest earning account or an investment vehicle is recommended to the user in some instances. For users associated with accounts triggered by OXF or AWL, automatic bill pay may be recommended.

Account Review

Figure 9:
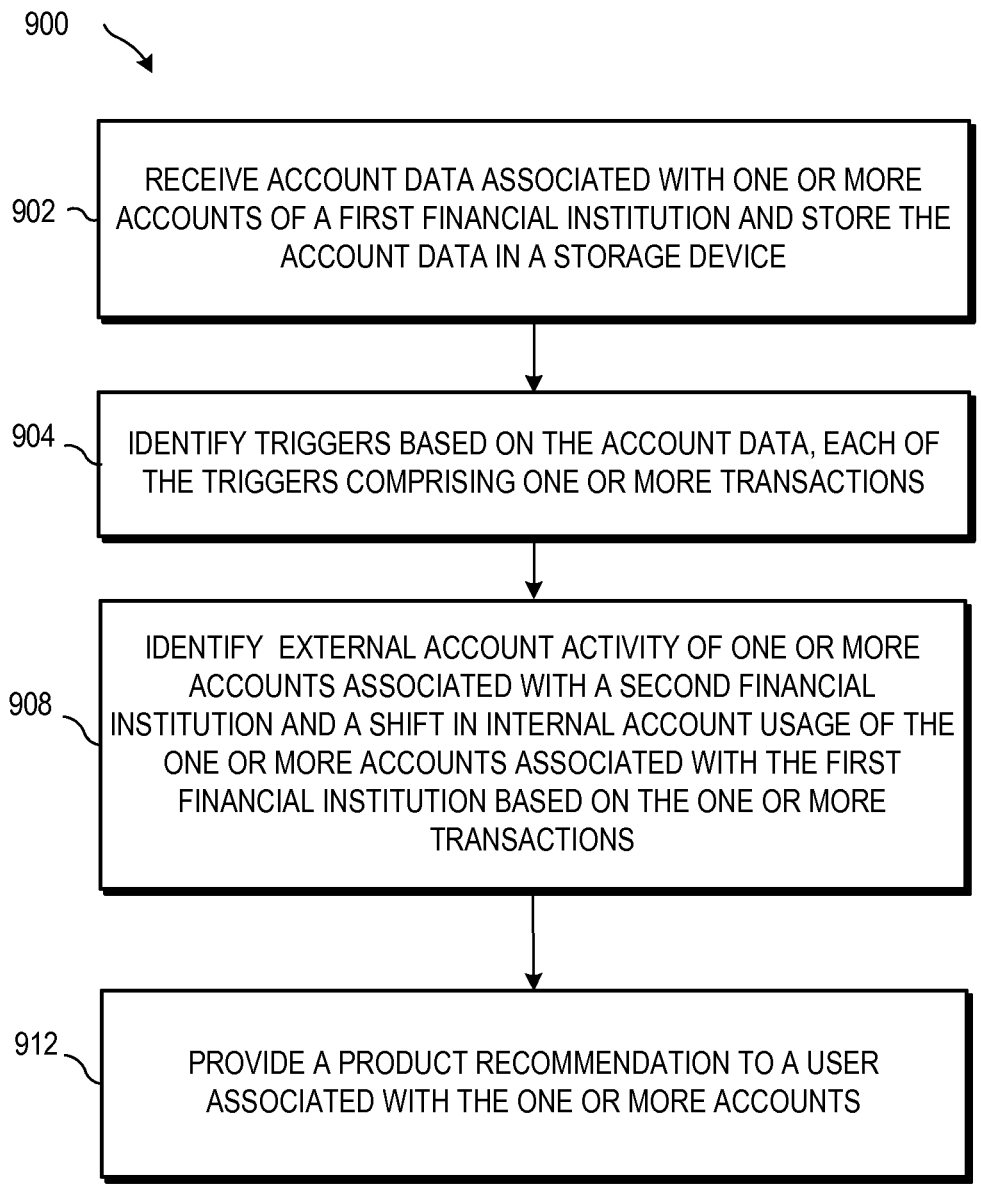
FIG. 9 is a flowchart illustrating a system and method for reviewing accounts to enhance user relationships and prevent account loss in accordance with various embodiments of the invention.

FIG. 9 is a flowchart providing an overview of a system and method 900 for reviewing accounts to enhance user relationships and prevent account loss. Account activity is reviewed in depth to timely identify account activity that signifies "off-us" transactions. For example, off-us transactions include a large withdrawal, opening a new account with a competitor or other third party entity, making a third party credit card payment, or any other account activity that signifies third party transactions. Timely identification of off-us activity can be used to avoid losing the user to a competitor and enhance the relationship with the user.

In block 902, account data associated with one or more accounts of a first financial institution is received and the account data is stored in a storage device (e.g., the user account data repository 380 or the trigger repository 400). In block 904, triggers are identified based on the account data, where each of the triggers comprises one or more transactions. For example, Trigger Table 3 of FIGS. 14E-14F provides triggers that include merchant purchases, third party credit card payments, large transaction withdrawals, payroll transactions, student loan payments, micro transfers, and job change activity.

In block 908, external account activity of one or more accounts associated with a second financial institution and a shift in internal account usage of the one or more accounts associated with the first financial institution is identified based on the one or more transactions. Various triggers of Trigger Table 3 in FIGS. 14E-14F include transactions that are indicative of external account activity. In some embodiments, the one or more transactions of the triggers occur during a predetermined period of time. For example, "First time competitor credit card payment" trigger (FOC) determines that a third party competitor payment has occurred in the last rolling six month period. In some embodiments, the account data is searched using keywords such as the names of third party financial institutions or third party credit card names. The transaction channels for FOC include bill pay, checking account, and ACH channels.

A "Large withdrawal" trigger (LWD) of Trigger Table 3 (FIG. 14E) includes outbound transactions each having an amount greater than $2,500, where the transaction amount is the product of the average total amount of all transactions of the previous six months and a predetermined constant, e.g., 2.5, and where the tenure of the one or more accounts is greater than 90 days. The outbound transactions of LWD are associated with ACH, ATM, teller, wired transfers, and checking account channels. Also provided in Trigger Table 3 of FIG. 14F is a "Micro ACH transfer" trigger (VFY). Micro transfers have transactions amounts under $1 and are used to verify the validity of credit card accounts or bank accounts. The micro transfers may be reversed once the account has been verified. For VFY, the micro transfers are credited to direct deposit account or savings accounts of a financial institution and indicate that larger transfers to another financial institution may be forthcoming.

The Trigger Table 3 of FIGS. 14E-14F also illustrates triggers that indicate a shift in internal account usage of the one or more accounts associated with the first financial institution based on the one or more transactions. A "Merchant purchases" trigger (AIU) includes purchases from predetermined merchants that occur during a particular period of time.

The predetermined merchants include merchants that have partnered with the financial institution, merchants associated with a rewards program, or any other types of merchants. In some embodiments, AIU indicates that the user of the one or more accounts has begun to participate in a rewards program or is eligible for rewards. A "Student loan" trigger (STL) includes payments on a student loan. The STL may indicate that the user or a family member has graduated from an educational institution or that the user or family member has begun school or is currently attending an educational institution. To identify transactions related to STL, the account data may be searched using keywords, Boolean, and strings that contain terms such as education, campus, tuition, student, financial aid, university, and the like.

In the "New payment" trigger (NPT), an indication that no pay was received during two previous months, but that pay was received during the current and immediate previous month is provided (see, FIG. 14E). For example, for a given year, if pay was received from January to March, and then pay was stopped during April to May, and then pay began coming in again from June to the current month of July, then NPT is triggered. In some embodiments, NPT indicates that the user has changed jobs. In other embodiments, NPT indicates that the user is a part time worker, free lance worker, contractor, business owner, or is engaged in some other type of employment or has stopped working. For example, the user may have retired.

In some embodiments, the triggers comprise transactions indicative of a shift in account activity associated with pay. For example, "Job Change" trigger (JCL) of Trigger Table 3 (FIG. 14F) includes at least three ACH direct deposits from the same employer for a four month stability period. JCL is triggered if pay frequency, i.e., the sum of the maximum number of days between the three most recent ACH deposits and "pad" passes without another ACH direct deposit by the employer. Pad is defined as +2 days if the maximum number of days is less than or equal to 7, +3 days if the maximum number of days is 8 to 18, or +5 days if the maximum number of days is 16 to 32 days. JCL may indicate, for example, that the user is no longer employed with a particular employer, the user has changed jobs, the pay schedule for the particular employer has changed, the user has changed positions, or the user has changed work schedules.

Referring again to FIG. 9, a product recommendation is provided to the user of the one or more accounts as illustrated in block 912. For FOC, a credit card offer may be presented to the user. For example, the credit card offer may include a low interest rate, a reward program, or any other offer that is competitive with the third party credit card. For LWD, the product recommendation, in some instances, is determined based on the reason for the withdrawal. For example, if the withdrawal is for transferring money to an investment vehicle or savings accounts associated with a third party financial institution, the product recommendation may be directed to an investment vehicle or savings account that is competitive with the third party investment vehicle or savings account. For accounts having transactions that have triggered STL, an account upgrade, a different type of account, loans, or loan counseling may be recommended to the user. For accounts having transactions that have triggered NPT, a retirement account, a different type of account, or other type of product or service may be recommended to the user.

Providing Offers

Figure 10:
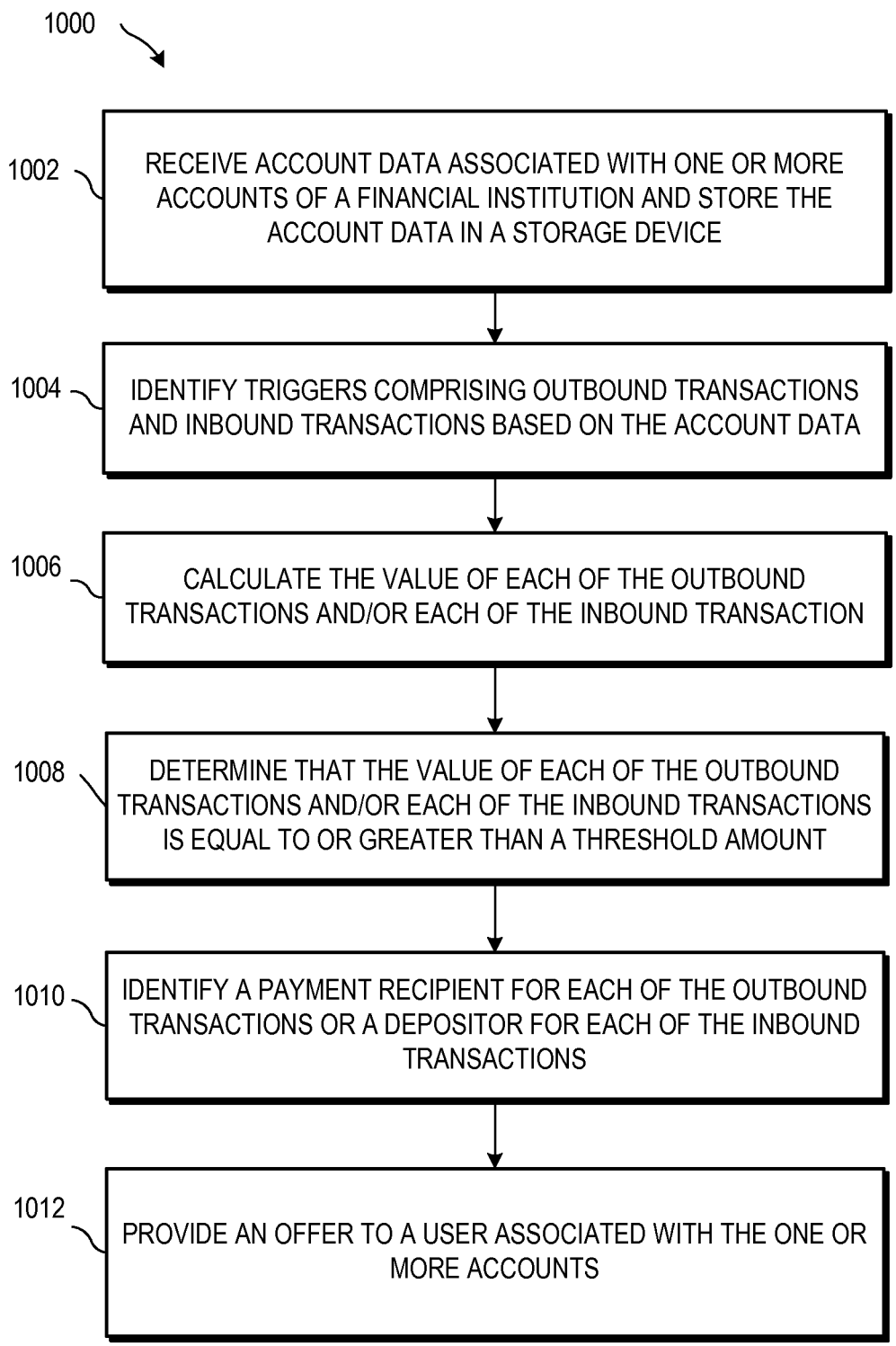
FIG. 10 is a flowchart illustrating a system and method for promoting new product sales in accordance with various embodiments of the invention.

FIG. 10 is a flowchart providing an overview of a system and method 1000 for promoting new product sales. In an embodiment, the system receives account data for a user, compares the account data to predefined triggers, and provides product recommendations to the user based on the comparison. In some embodiments, the account data are related to outbound and/or inbound transactions for the user. Based on inbound and outbound account activity, targeted offers for new products may be provided to the user. In some embodiments, the new product offers are offers for products and/or services provided by the financial institution, such as products that are customized for the user based on the account data. In other embodiments, the new product offers are offers for products and/or services provided by a partner of the financial institution. The system and method 1000 is a service provided to customers of the financial institution by providing information on offers that the customers may be interested in based on transaction data. The triggers target these offers to the customer at the appropriate time and, in some cases, with the appropriate offer.

The product recommendation may be for a product offered by the financial institution providing the system or may be a product offered by a partner of the financial institution. For example, the product may be an offer for a new type of account, such as a brokerage account, a checking or savings account, a credit card, an insurance policy, etc. When the product is offered by a partner of the financial institution, the offer may be for any type of product or service. In an embodiment, the offer is customized for the user. For example, the offer may be customized based on the identity of the trigger. An example would be triggers related to tax refunds may prompt an offer for tax planning services. In another embodiment, the offer is customized for the user based on the amount of the transaction that triggered the offer. For example, an offer may be for a service that costs less than the user's current service, based on the amount transferred out of the user's account for that service. The cost of the user's current service is known and a new offer can be provided that is less than the user's current service.

In block 1002, the system 1000 receives account data associated with one or more accounts of a financial institution and stores the account data in a storage device. As discussed herein, the accounts may be any type of account hosted at the financial institution or available to the institution through networked connections. In an embodiment, the accounts are evaluated on a regular basis, e.g., nightly, to identify all transactions that have been performed by the user since the previous evaluation. Both inbound, i.e., deposits, and outbound, i.e., withdrawals, may be evaluated. In an embodiment, transfers between accounts are also evaluated to identify potential triggers. In block 1004, the system identifies triggers based on the account data. In some embodiments, the system calculates the value of outbound transactions, as shown in block 1006. The value for outbound transactions may be aggregated into categories, such as all education related expenses, or may be identified individually, such as a monthly bill pay expense to a telecom company. In some embodiments, the system calculates the value of inbound transactions, as shown in block 1008. The value of inbound transactions may be compared to other inbound transactions, such as similar transactions made during different time periods. The trigger groups may be further identified based on an amount, a transaction channel, an account type, and the like. In some embodiments, the system determines the party on the opposite end of the transaction from the user and/or financial institution, as shown in block 1010. For example, the party receiving the payment from the user or the party depositing the funds into the account is identified by the system. Once the trigger and in some cases the party is identified, the system may provide an offer to the user, as shown in block 1012. In some embodiments, the offers are based on the nature of the trigger. For example, triggers related to tax refunds may be result in offers related to tax planning services. In another embodiment, the offers are based on the size of the transaction identified in the trigger. For example, large brokerage account transfers may result in offers for premium products or services.

Exemplary triggers relating to the system and method 1000 are illustrated in Trigger Table 4 of FIGS. 14G-14I. In some embodiments, the triggers are categorized and labeled based on an event, objective, or transaction. For example, all of the triggers in Table 4 are grouped together because they each have same objective of new product offers. Triggers relating to new product offers are grouped and labeled based on outbound transactions and triggers based on inbound transactions.

For example, a competitor brokerage outflow (CBO) trigger may be used to provide new product offers or sale to customers. In an embodiment, the competitor brokerage outflow trigger determines whether the user had third party competitor brokerage payments of at least $1,000 for a single month (30 day rolling) or at least $500 per month over a three month period. The competitor brokerage outflow trigger includes three components: (1) competitor brokerage outflow total for the first of the three month rolling period (CB1), (2) competitor brokerage outflow total for the second of the three month rolling period (CB2), and (3) competitor brokerage outflow total for the third of the three month rolling period (CB3). In one embodiment, each of the rolling three months is limited to thirty days. In an embodiment, the system 1000 evaluates the outbound transactions to identify any transactions that are being deposited in competitor brokerage accounts. For example, the system may evaluate ACH transactions, bill pay transactions, check transactions, and wire transactions to identify the recipient of the funds. When checks are evaluated, image identification software may identify the recipient of the check. In an embodiment, the recipient is identified by a BRK or brokerage code. In some embodiments, the system determines that the transaction is going to a competitor brokerage account based on the name of the account to which the transaction is being directed. In some embodiments, the system includes a database of competitor brokerage names, account numbers, and/or account names. In another embodiment, the system receives the destination of the transaction from the user, either through a response to a request from the financial institution or provided when establishing the transfer. Given CB1, CB2, and CB3, the system 1000 can determine whether at least $500, or any other predetermined amount that has been determined by the system, has been transferred to a competitor brokerage over each of the previous three months.

When the system determines that the CBO trigger has been identified for an individual, such as when the minimum amount for a single month has been identified (e.g., $1,000) or the minimum amount for the previous three months has been identified based on the account data for the user, the system 1000 provides an offer to the user. As discussed, the offer may be targeted to the user based on the trigger. For example, the offer may be for brokerage services provided by the financial institution rather than by the competitor institution. In the offer, advantages of staying with the financial institution may be provided. The financial institution may charge less for a brokerage account, the financial institution may provide better reporting regarding status of the brokerage account, and/or the financial institution may provide better service. In another embodiment, the trigger causes an offer for a different type of product to be offered to the user. For example, the CBO trigger may indicate that the user has disposable income and thus may desire offers targeted to items or services on which the user can spend the disposable income. Optionally, the offers may be targeted to a demographic identified based on the user of a brokerage account. For example, premium checking accounts may be offered to the user.

Triggers related to educational payments may also be used to provide offers to customers. For example, the college preparation (SAT) trigger for payments made to college preparation or tutoring for such preparation can be used to provide offers to customers. The SAT trigger may be identified based on payments to college preparatory tests, classes for those tests, online or mail order expenses. Also, business names may be identified as being associated with college preparation and included in the SAT trigger. Further, expenses associated with visiting colleges may be identified, such as expenses at student unions, student bookstores, etc., and correlated with a user that is considering going to or going to college. In an embodiment, once the SAT trigger is identified, the customer is offered a product or service. For example, the customer may be offered student loans, a student credit card, a student checking account, or other financial services provided by the financial institution that are appropriate for a college student.

In another example, a second type of education trigger (EDU) may be used to provide offers to customers. For example, business names may be included in a database and referenced to identify educational payments. In an embodiment, keywords or portions of words are flagged as potentially identified an education-related expense. For example, the words "education," "student," "campus," "tuition," "financial aid," or "U.S. Department of Education" in a recipient name may be identified as potentially related to an educational expense. The customer may be queried to determine if the expense is an education expense or employees of the financial institution may evaluate the expense to classify it. Again, transactions may be evaluated through multiple channels, such as ACH, checks, and person-to-person transactions (e.g., transactions facilitated through mobile devices). Once, the EDU trigger has indicated a person engaging in educational spending, the system may provide offers to the user. For example, the system may offer the user credit counseling for educational expenses, student credit cards, student loans, or services relating to tax deductions for educational expenses. For example, a user with a certain amount of education expenses may be provided with information on the tax deductions for which that the individual qualifies.

Online shopping (OLS) may also be a trigger that causes an offer to be provided to the user. Customers may be identified based on transaction channels, such as online purchases with a credit card, debit card, or account transfer. In an embodiment, outbound transactions with category codes such as pay, clothing stores, department stores, discount stores, drug stores, sporting goods stores, hobby, toy and game shops, vehicles, electronic appliance stores, food stores, interior furnishing stores, hardware stores, other retail stores, education, health insurance, other services, professional services, recreation, repair shops, airlines, restaurants, bars, lodging such as hotels, motels, and resorts, other transportation, and travel agencies are identified as having transactions completed through an online portal like a website. Keywords or phrases in transaction recipient names such as "www," "com," "http," "direct," "drct," "e-comm," "online," and "onln" may be identified and used to indicate the OLS trigger. Once the OLS trigger has been identified for a user based on the account data, the system provides an offer to the user. For example, if the user made the purchase with a debit card, the system may offer the user a credit card to increase security of online transactions. In an embodiment, partners of the financial institution may provide offers to the user. For example, the system may determine that the user made a purchase at an online drugstore. The system may then provide an offer to the user for free shipping from a different online drugstore or offer coupons to the user for use at a brick and mortar store near to the user.

Another trigger is the off us credit card (OUC) trigger. In this trigger, the system evaluates outgoing transactions to identify payments to credit cards offered by entities other than the financial institution providing the system. The system identifies these payments based on the account number, the name associated with the receiving account, or by receiving user input. Bank names associated with credit providers may be flagged to identify off-us credit card payments. Regular transfers to a specific account may also be indicative of off-us credit card payments. Online bill pay transactions, ACH, checks, or transfers may also be used to identify off-us credit card payments. Once the system identifies the OUC trigger for a user, the system can provide offers to the user. In an embodiment, the system provides a competing credit card offer to the user. In some embodiments, the offer compares the terms of the financial institution's credit card to the credit card currently being used by the user. In some embodiments, balance transfers are suggested or offered. Discounts and savings associated with transferring a balance to the financial institution may be highlighted in the offer. In another embodiment, credit counseling services are offered to the user. In a still further embodiment, loan products, such as home equity loans, are offered to the user so that the user may pay off the credit card.

In some embodiments, telecom payments (TEL) triggers and wireless service (WIR) triggers are identified based on account data for users. The TEL trigger indicates that a user has made a payment to a telecom business. In an embodiment, the TEL trigger is identified using business names including the words "internet" or "cable." Similarly, the WIR trigger may be identified based on business names including the words "phone" or "wireless." Online bill pay systems may query the user when setting up bill pays to telecom or wireless businesses and in this manner identify outbound transactions. In another embodiment, merchant category codes (MCC) are used to identify the recipient of a payment. For example, the merchant category codes 4812, 4814, and/or 4815 may be used to identify a payment to a telecom or wireless company. Once the TEL or WIR trigger is identified from the user's account data, the system may provide offers to the user. As discussed, in one embodiment the offers relate to the trigger. In this case, the user for whom a TEL trigger is identified may be provided an offer by a competitor of the telecom company to which the payment is going. The WIR trigger may prompt offers for wireless service. Given that the system has the current and historical payment amounts for the telecom or wireless services, the system may provide offers that save the user money or provide better service for the same amount of money.

In a further embodiment, payments for insurance products are evaluated based on an insurance (INS) trigger. The insurance payment may be identified based on a name of the payment recipient, based on a merchant category code associated with insurance payments, based on an account number, based on input from the user, or based on a keyword, phrase, or portion of a word in the recipient name. In one embodiment, the user volunteers or is prompted to identify the nature of the payment. In some embodiments, the system identifies recurring payments of a similar amount and on regular basis that share characteristics of insurance payments. The payments may be made through a variety of channels, such as ACH transfer, check, credit card, bill pay, etc. Once the insurance payment is identified as the INS trigger, the system may offer the user a new product. In one embodiment, the new product is a competitor's insurance product, such as home insurance, car insurance, or health insurance. In some embodiments, the difference in price between the offered insurance product and the user's current insurance product is calculated and provided to the user. In another embodiment, the insurance payment indicates to the system a new purchase, such as a new automobile or home, and therefore provides opportunities to provide targeted offers to users. For example, a new home insurance policy may indicate that the user recently purchased a home. The system may then offer refinancing options to the user.

While the previous triggers have been based on outbound transactions, it should be understood that inbound transactions may also be evaluated in account data and triggers identified therefrom. For example, in some embodiments, the account data is evaluated for a large deposit trigger (LDS). In an embodiment, large deposits for which the transaction amount is greater than a predetermined amount, e.g., $2,500, cause the system to identify the trigger. It should be understood that while $2,500 is provided as an example, the amount may be greater or less than this example. In another embodiment, the LDS trigger is based on a transaction amount that is greater than a predetermined amount, e.g., 2.5, times the average of deposits for the previous six months. In one embodiment, the LDS trigger is only evaluated for accounts that have greater than ninety days of account data. The LDS trigger indicates that a large deposit that may be outside of the norm of the user has been deposited into the user account. For example, the user may have received a gift. In an embodiment, once the system identifies the LDS trigger, the system provides offers to the user. The offers may be provided to assist the user in managing the large deposit, such as wealth management advice, special accounts (e.g., retirement accounts, etc.), or special investment opportunities (e.g., certificates of deposit, etc.). In another embodiment, partners of the financial institution may provide offers to the user based on the information that the user has recently made a large deposit. For example, offers for products for sale by affiliated stores or businesses may be targeted to the user based on the amount and/or timing of the deposit.

Another example where inbound transactions are used to identify a trigger in account data is a payment increase (PIT) trigger. In some embodiments, inbound transactions into an account of the user indicate an increase in pay by a given percentage, such as 10%, or more during the current and previous month compared over a period of two months. In this embodiment, the trigger may indicate that the user received a salary raise. By spreading the increase over two months and comparing the two month period to a previous two month period, the system is able to exclude one time events that may not indicate an increase in earning ability. In an embodiment, the inbound transaction is direct deposited from the user's employer. In this case, the system may identify the inbound transaction based on the account depositing the funds, e.g., the account may be associated with an employer or a salary processor. In another embodiment, the system identifies the payment increase from paychecks deposited with the financial institution. A paycheck may be scanned and character recognition software may identify the payor based on information present on the face of the paycheck. Once the system identifies the PIT trigger, the system may provide an offer to the user. For example, the offer may be related to the increased spending power of the user or the offer may be related to financial management services.

A similar trigger to the PIT trigger is the bonus recurrence trigger. The bonus recurrence trigger identifies a subset of large deposits as bonuses. In one embodiment, the bonus recurrence triggers predicts that a paycheck will include a bonus based on account history for a previous period of time, such as two years of account data. In an embodiment, the trigger is refreshed on a yearly basis. In some embodiments, the bonus recurrence trigger is based on stability, e.g., the system determines that paycheck deposits are received by the financial institution at least ten months in a year, and increase in a single paycheck, e.g., the system identifies a single paycheck with an amount at least twice as much as the median value of all paychecks in a year. In some embodiments, the increase has a minimum value, such as $2,500.00, to exclude job-expense reimbursements that are included in a paycheck. In further embodiments, the timing of the single paycheck is evaluated as well to determine whether the paycheck is deposited during bonus season, for example during December, January, February, and March. For example, the system may determine that the user receives a bonus during the second week of February of every year. The system therefore predicts that the paycheck received immediately after the second week of February will include a bonus. Once the system either identifies a bonus or predicts that a bonus will be present in an upcoming paycheck, the system can provide offers related to products associated with the bonus. For example, money management services, tax services, investment opportunities, premium accounts, or offers from partners of the financial institution may be provided to the user. In one embodiment, the offers from partners of the financial institution are tailored so that the product or service being offers is approximately equal in cost to the size of the bonus.

In some embodiments, deposits of tax refunds may be analyzed for triggers. For example, FIG. 14I discloses three triggers related to tax refunds: the tax recurrence trigger, the tax rebate/refund trigger, and the Tax Refund having a total transaction amount greater than or equal to a predetermined amount (e.g., $1,000) trigger. Many people receive a tax refund every year from both federal and state sources. The system may identify the source of the incoming deposit based on the account name of the depositing entity, for example the name of the depositing entity may include keywords such as "federal," "tax," "IRS," or "refund." Timing of the deposit may also be used to identify the nature of the deposit. In many cases, federal and state tax refunds are deposited in February to May of every year. The system may identify the deposit as a tax refund based on the name of the party depositing the funds into the account, the time of year that the deposit is made, and the size of the deposit. In a first embodiment, the tax recurrence trigger is based on the system identifying tax refunds of at least a predetermined amount in the previous two years. For example, the amount may be at least $10,000 or at least $5,000. In an embodiment, this trigger is refreshed on a yearly basis. In a second embodiment, the tax refund having a total transaction amount of greater than or equal to a predetermined amount may be a different trigger that captures a one-time tax refund of a specific size. For example, the amount may be greater than or equal to $1,000 or $2,000. In an embodiment, users may receive one time only tax benefits, such as when buying a home or having large tax deductions, that result in a larger than normal tax refund. This is captured on a yearly basis rather than requiring a trigger that analyzes the user's account information over a multiple year span. In a still further embodiment, a tax rebate/refund trigger may include any deposits that are identified as being received as a tax refund or rebate.

As discussed previously, triggers may result in offers being made to users based on the identity of the trigger. Tax refunds triggers are an example of where offers may be made to users based on the identity of the trigger. For example, consistent large tax refunds such as the tax recurrence trigger may indicate that the user should change tax withholding from paychecks or reduce quarterly tax payments so that the user does not receive such a large, consistent tax refund. Tax planning services may be offered to users that consistently or at least one-time receive large tax refunds. Optionally, the offers may be related to the greater spending ability of users after receiving the tax refund or the offers may be related to investment opportunities for investing and saving the tax refund.

Policy Education

Figure 11A:
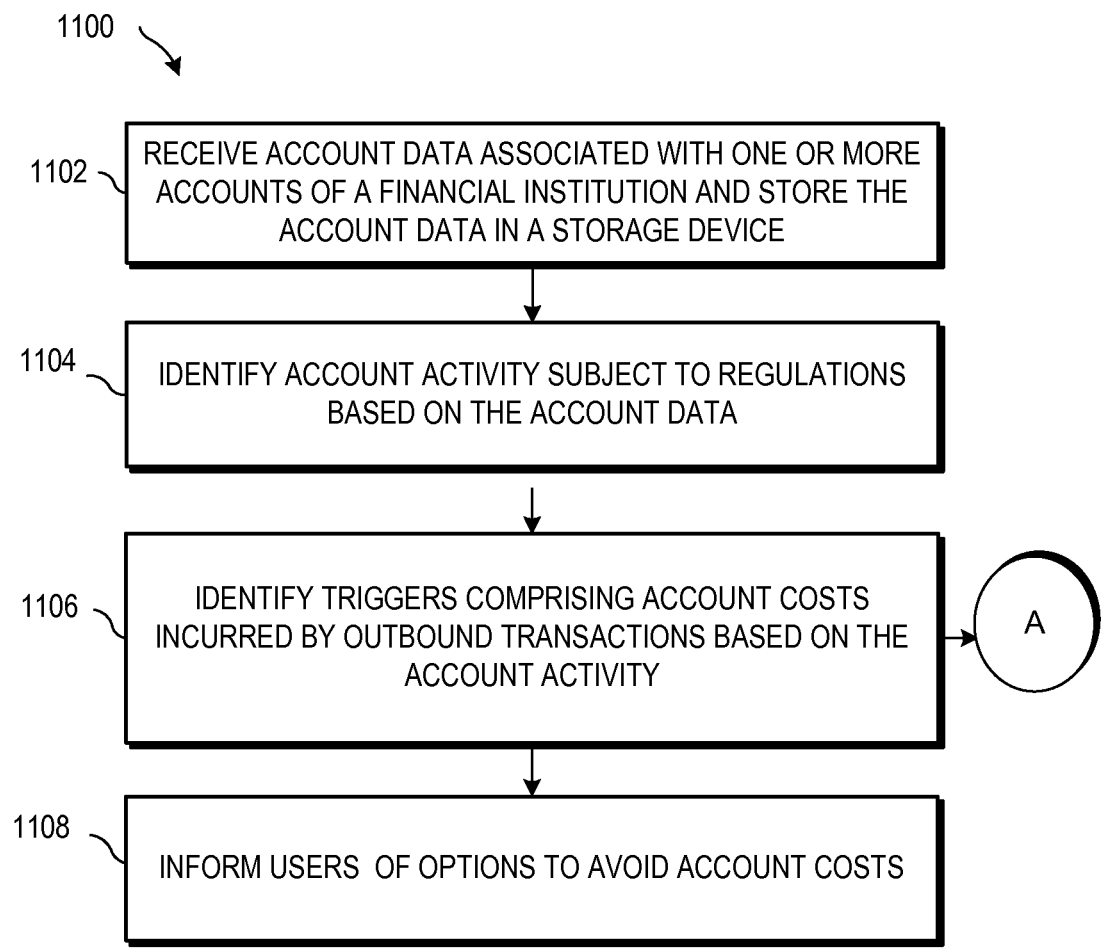
FIGS. 11A-11B are flowcharts illustrating a system and method for promoting account policy education in accordance with various embodiments of the invention.
Figure 11B:
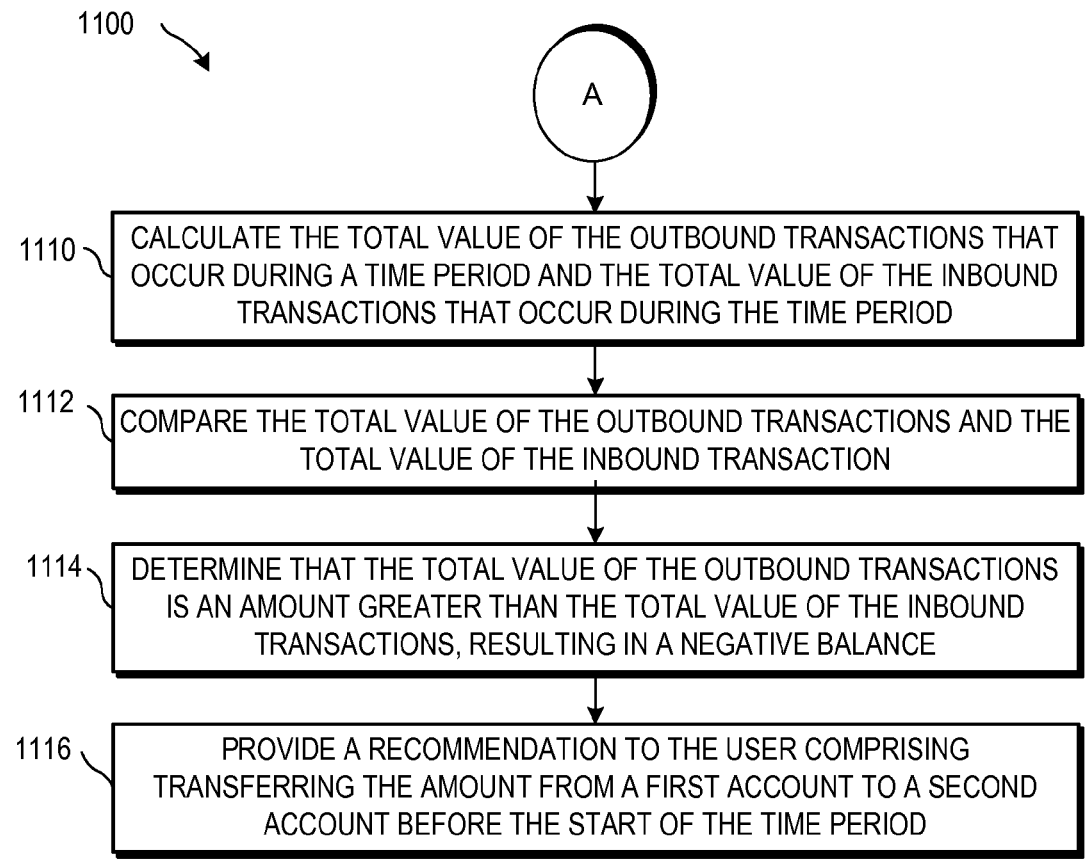

FIGS. 11A-11B are flowcharts providing an overview of a system and method 700 for promoting account policy education. In an embodiment, the system receives account data for a user, compares the account data to predefined triggers, and provides policy education to the user prompted by the trigger. In some embodiments, the account data are related to transactions that implicate governmental or business policies. Based on account activity, targeted information relating to policies may be provided to the user. In some embodiments, the policy education information is offers is provided by the financial institution and relates to the policies of the financial institution. In further embodiments, offers are also provided to the user related to the policy. For example, when an account transaction relates to a financial institution policy for a specific type of account, the user may be provided the terms and conditions for the account and also offered an upgrade and/or downgrade of account type to more appropriately position the user's accounts. In other embodiments, the policy education information is for information related to governmental policy, such as increases in contribution limits to government retirement accounts. The system and method 1100 is a service provided to customers of the financial institution so that the customers are educated on the most recent policies affecting their financial accounts. The triggers target this information to the customer that may benefit from the policy information at times when the customers may be open to learning about the policies.

In block 1102 of FIG. 11A, the system 1100 receives account data associated with one or more accounts of a financial institution and stores the account data in a storage device. As discussed herein, the accounts may be any type of account hosted at the financial institution or available to the institution through networked connections. In an embodiment, the accounts are evaluated on a regular basis, e.g., nightly, to identify all transactions that have been performed by the user since the previous evaluation. Both inbound, i.e., deposits, and outbound, i.e., withdrawals, may be evaluated. In an embodiment, transfers between accounts are also evaluated to identify potential triggers. In block 1104, the system identifies account activity subject to regulations based on the account data. In some embodiments, the account data is evaluated based on changes in policies that have occurred recently. In some embodiments, the system identifies triggers comprising accounts costs incurred by outbound transactions, as shown in block 1006. The value for outbound transactions may be aggregated into categories, such as financial institution expenses, or may be identified individually, such deposits into accounts receiving special governmental treatment. In some embodiments, the system informs users of options to avoid account costs, as shown in block 1008. For example, the system may recommend a different type of account, may recommend that the user keep a minimum balance in an account, or that the user transfer funds from one account to another account. In still further embodiments, the system may offer to waive costs associated with various policies on a one time or ongoing basis, based on either characteristics of the user account data or the trigger.

Turning now to FIG. 11B, when the system identifies triggers comprising account costs incurred by outbound transactions based on account activity in block 1106, the system may undertake a subsidiary process flow to provide targeted policy education to users. In particular, in block 1110, the system calculates the total value of the outbound transactions that occur during a time period and the total value of the inbound transactions that occur during the time period. In some embodiments, the outbound and inbound transactions are compartmentalized into accounts such that the total amount of inbound and outbound transactions is calculated for each account. In an embodiment, the total amount of inbound and outbound transactions is also calculated for the aggregated accounts of the user.

In block 1112, the system compares the total value of the outbound transactions and the total value of the inbound transactions. In block 1114, the system determines that the total value of the outbound transaction for a specific account is an amount greater than the total value of the inbound transactions for the specific account, resulting in a negative balance for the account. In an embodiment, the system receives and/or determines the initial balance in the account and the change in the account balance based on the total value of the outbound transactions and the total value of the inbound transactions. If the difference between the outbound transactions and the inbound transactions is greater than the initial balance, the account may result in a negative balance. When the outbound transactions are greater than the inbound transactions for a specific account, the system may provide a recommendation to the user, wherein the recommendation comprises transferring an amount from a first account to the specific account to cover the difference between the outbound and inbound transactions, as shown in block 1116. In some embodiments, the system determines the first account includes sufficient funds that the transfer of funds will not send the first account to loss.

Exemplary triggers relating to the system and method 1100 are illustrated in Trigger Table 5 of FIG. 14J. In some embodiments, the triggers are categorized and labeled based on an event, objective, or transaction. For example, all of the triggers in Table 5 are grouped together because they each have same objective of providing policy education to users. Triggers relating to policy education are grouped and labeled based on unavailable funds or accounts gone to loss. It should be understood that other triggers related to policy education may be possible. For example, policy education triggers related to governmental retirement accounts, educational savings accounts, health savings accounts, credit card regulations, mortgage and/or refinancing regulations, or federal and/or state tax regulations may be provided to users when appropriate triggers are identified based on the user's account data.

In one embodiment, policy triggers may be related to first time incidents associated with user accounts. For example, the first time unavailable funds trigger disclosed in FIG. 14H may be identified based on account costs being incurred for unavailable funds for the first time in a predetermined time period, such as six months or one year. When the trigger identifies unavailable funds in a user account, the system may provide policy education, such as the effect of unavailable funds on the account, different accounts that may not be subject to unavailable funds, options for linking accounts to transfer funds, etc. Additionally, the system may offer waiving or reimbursement of any costs associated with the unavailable funds. More generally, the system may offer policy education related to budgeting and/or account maintenance to the user.

Another first time incident is the trigger associated with first time account gone to loss. In an embodiment, a transaction causes an account to go to loss, which may incur policy effects. The system may identify the account gone to loss from keywords associated with the withdrawal from the account, based on the account balance, or based on input from the user. When the system identifies the first time account gone to loss trigger, the system may provide policy education to the user relating to account gone to loss status. For example, the user may provide information to the user relating the financial institution's policies relating to protection from allowing an account to go to loss. The system may also provide information on first-time forgiveness programs for account gone to loss. Still further, the system may provide policy information relating to transferring funds from another account. For example, the system may determine that another account of the user has sufficient funds to cover the difference in the account gone to loss and suggest or automatically transfer the funds for the user.

In some embodiments, the policy education trigger is based on recurring events. For example, an unavailable funds trigger may be identified when a user account incurs costs for unavailable funds. In general, if this is not the first time this has occurred within the previous six months, the system may provide additional policy information relating to financial institution regulations or policies. For example, while the first instance of unavailable funds may be subject to certain policies, such as forgiveness, the second instance of unavailable funds may be subject to different policies, such as forgiveness when registering for a special account. Linking a second account to the account gone to loss may result in different policy consequences or options.

In a still further embodiment, the account gone to loss trigger may be identified when a user's account data indicates that account costs are incurred for the account gone to loss. As with the unavailable funds trigger, if this is not the first time that the account has gone to loss, the financial institution may provide additional and/or different information relating policy and regulations than if this is the first account gone to loss indication in the user account data. One skilled in the art would understand that account gone to loss may indicate the need for policy education relating to account transfers and possibly account closing. Different accounts may be more appropriate for the user than the user's current accounts. Finally, policy education may be provided to the user in ways of structuring funds in accounts so that account gone to loss status is less likely to occur in the future.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system for monitoring trigger data quality associated with one or more accounts of a financial institution, the system comprising:
    a computer apparatus including a processor and a memory; and
    a trigger software module stored in the memory, comprising executable instructions that when executed by the processor cause the processor to:
        receive account data associated with the one or more accounts;
        store the account data in a storage device;
        segregate the account data into one or more periods of time;
        identify inbound transactions that regularly occur during the one or more periods of time, each period of time comprising a minimum and maximum number of days between the occurrence of the inbound transactions;
        increase the length of each of the one or more periods of time by an additional number of days that is proportional to the length of each of the one or more periods of time;
        identify triggers associated with the one or more periods of time based on the inbound transactions that occur during the one or more periods of time;
        calculate a total transaction count for each of the triggers;
        determine control limits based on the transaction count for each of the triggers;
        calculate a lower control limit as the difference of the trimmed mean of the transaction count and the standard deviation of the transaction count;
        calculate an upper control limit as the sum of the trimmed mean of the transaction count and the standard deviation of the transaction count; and
        detect outliers based on the lower control limit and the upper control limit.

2. The system of claim 1, wherein the module is further configured to:
    delete the outliers from the trigger data.

3. The system of claim 1, wherein the module is further configured to:
    calculate a first lower control limit for transactions that occur during a first period of time and a second lower control limit for transactions that occur during a second period of time;
    compare the first lower control limit and the second lower control limit;
    determine the first lower control limit is higher or lower than the second lower control limit;
    calculate a first upper control limit for transactions that occur during the first period of time and a second upper control limit for transaction that occur during the second period of time;
    compare the first upper control limit and the second upper control limit; and
    determine that the first upper control limit is higher or lower than the second upper control limit;
    wherein the detection of the outliers is based on the comparison of the first lower control limit and the second lower control limit and the comparison of the first upper control limit and the second upper control limit.

4. The system of claim 3, wherein the module is further configured to:
    determine the cause of the outliers.

5. The system of claim 3, wherein the module is further configured to:
    determine that the outliers comprise the transactions that occur during the first period of time.

6. The system of claim 5, wherein the module is further configured to:
    delete the transactions that occur during the first period of time from the trigger data.

7. The system of claim 5, wherein the module is further configured to:
    delete at least one of the transactions that occur during the first period of time from the trigger data; and
    recalculate the transaction count for a trigger associated with the first period of time.

8. The system of claim 5, wherein the module is further configured to:
    determine that the transactions that occur during the second period of time comprise first parameters;

compare the transactions that occur during the first period of time with the transactions that occur during the second period of time;
determine that at least one of the transactions that occur during the first period of time comprises second parameters that fall outside of the range of the first parameters;
modify the first parameters.

9. The system of claim 3, wherein the module is configured to:
tag the outliers;
report the tagged outliers to an analyst.

10. The system of claim 1, wherein the module is configured to:
calculate a first transaction count for a first trigger associated with a first period of time
determine that the first transaction count for the first trigger is within an acceptable range of values;
calculate a second transaction count for a second trigger associated with a second period of time; and
determine that the second transaction count for the second trigger is outside of the acceptable range of values.

11. The system of claim 10, wherein the module is configured to:
tag the second trigger as an outlier trigger.

12. The system of claim 10, wherein the module is configured to:
tag the first trigger as a normal trigger.

13. A computer-implemented method for monitoring trigger data quality associated with one or more accounts of a financial institution, the method comprising:
receiving account data associated with the one or more accounts;
storing the account data in a storage device;
segregating, by a processor, the account data into one or more periods of time;
identifying, by a processor, inbound transactions that regularly occur during the one or more periods of time, each period of time comprising a minimum and maximum number of days between the occurrence of the inbound transactions;
increasing, by a processor, the length of each of the one or more periods of time by an additional number of days that is proportional to the length of each of the one or more periods of time;
identifying, by a processor, triggers associated with the one or more period of time based on the inbound transactions that occur during the one or more periods of time;
calculating, by a processor, total transaction count for each of the triggers;
determining, by a processor, control limits based on the transaction count for each of the triggers;
calculating, by a processor, a lower control limit as the difference of the trimmed mean of the transaction count and the standard deviation of the transaction count;
calculating, by a processor, an upper control limit as the sum of the trimmed mean of the transaction count and the standard deviation of the transaction count;
detecting, by a processor, outliers based on the lower control limit and upper control limit.

14. The method of claim 13, further comprising:
deleting, by a processor, the outliers from the trigger data.

15. The method of claim 13, further comprising:
determining, by a processor, the cause of the outliers.

16. The method of claim 13, further comprising:
determining, by a processor, that the transactions of the triggers comprise a threshold amount;
calculating, by a processor, a specific range of values for the transactions based on the threshold amount;
determining, by a processor, that the value of at least one of the transactions falls outside of the specific range of values; and
increasing or decreasing, by a processor, the threshold amount.

17. A computer program product for monitoring trigger data quality associated with one or more accounts of a financial institution, the computer program product comprising:
a non-transitory computer readable storage medium having computer readable program code embodied therewith, the computer readable program code comprising:
computer readable program code configured to receive account data associated with the one or more accounts;
computer readable program code configured segregate the account data into one or more periods of time;
computer readable program code configured to identify inbound transactions that regularly occur during the one or more periods of time, each period of time comprising a minimum and maximum number of days between the occurrence of the inbound transactions;
computer readable program code configured to increase the length of each of the one or more periods of time by an additional number of days that is proportional to the length of each of the one or more periods of time;
computer readable program code configured to identify triggers associated with the one or more periods of time based on the inbound transactions that occur during the one or more periods of times;
computer readable program code configured to calculate a total transaction count for each of the triggers;
computer readable program code configured to determine control limits based on the transaction count for each of the triggers;
computer readable program code configured to calculate a lower control limit as the difference of the trimmed mean of the transaction count and the standard deviation of the transaction count;
computer readable program code configured to calculate an upper control limit as the sum of the trimmed mean of the transaction count and the standard deviation of the transaction count; and
computer readable program code configured to detect outliers based on the lower control limit and the upper control limit.

18. The computer program product of claim 17, further comprising computer readable program code configured to tag the outliers; and report the outliers to an analyst.

* * * * *